US012720059B2

(12) United States Patent
Sühring et al.

(10) Patent No.: US 12,720,059 B2
(45) Date of Patent: Aug. 25, 2026

(54) ENCODER, DECODER AND METHODS FOR CODING A DATA STRUCTURE

(71) Applicant: Fraunhofer-Gesellschaft zur Förderung der angewandten Forschung e.V., Munich (DE)

(72) Inventors: Karsten Sühring, Berlin (DE); Michael Schäfer, Berlin (DE); Jonathan Pfaff, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 33 days.

(21) Appl. No.: 19/017,823

(22) Filed: Jan. 13, 2025

(65) Prior Publication Data

US 2025/0150589 A1 May 8, 2025

Related U.S. Application Data

(63) Continuation of application No. PCT/EP2023/069067, filed on Jul. 10, 2023.

(30) Foreign Application Priority Data

Jul. 11, 2022 (EP) .................................... 22184232

(51) Int. Cl.

*H04N 19/172* (2014.01)
*H04N 19/126* (2014.01)
*H04N 19/91* (2014.01)

(52) U.S. Cl.

CPC ......... *H04N 19/126* (2014.11); *H04N 19/172* (2014.11); *H04N 19/91* (2014.11)

(58) Field of Classification Search

CPC ..... H04N 19/126; H04N 19/172; H04N 19/91

(Continued)

(56) References Cited

U.S. PATENT DOCUMENTS

2021/0136385 A1 5/2021 Schwarz et al.
2022/0174281 A1 6/2022 Jiang et al.

FOREIGN PATENT DOCUMENTS

WO 2021123438 A1 6/2021

OTHER PUBLICATIONS

G.K. Wallace, "The jpeg still picture compression standard," IEEE Transactions on Consumer Electronics, vol. 38, No. 1, pp. xviii-xxxiv, 1992, XP000297354.

(Continued)

*Primary Examiner* — Nguyen T Truong
(74) *Attorney, Agent, or Firm* — PV IP PC; Wei Te Chung

(57) ABSTRACT

An apparatus for decoding a data structure from a data stream is configured for sequentially reconstructing a set of features, wherein the apparatus is configured for reconstructing a feature of the set of features by deriving a quantization index from the data stream using arithmetic decoding; mapping the quantization index to a reconstruction value in dependence on a quantization state, and assigning the reconstruction value to the feature; updating the quantization state in dependence on the quantization index and the quantization state; and deriving the data structure based on the set of features. The apparatus is configured for deriving probabilities for the arithmetic decoding of the quantization index in dependence on the quantization state.

21 Claims, 12 Drawing Sheets

(58) Field of Classification Search
USPC .................................................... 375/240.02
See application file for complete search history.

(56) References Cited

OTHER PUBLICATIONS

David Taubman and Michael Marcellin, "JPEG2000 Image Compression Fundamentals, Standards and Practice", Springer Publishing Company, Incorporated, 2002.
V. K. Goyal, "Theoretical foundations of transform coding," IEEE Signal Processing Magazine, vol. 18, No. 5, pp. 9-21, 2001, XP001061202.
G. J. Sullivan, W. Han, J.-R. Ohm and T. Wiegand, "Overview of the high efficiency video coding (HEVC) standard," IEEE Transactions on Circuits and Systems for Video Technology, vol. 22, No. 12, pp. 1649-1668, 2012.
"High Efficiency Video Coding," ITU-T Rec. H.265 and ISO/IEC 23008-10, 2024.
B. Bross, Y.-K. Wang, Y. Ye, S. Liu, J. Chen, G. J. Sullivan, and J.-R. Ohm, "Overview of the versatile video coding (vvc) standard and its applications," IEEE Transactions on Circuits and Systems for Video Technology, vol. 31, No. 10, pp. 3736-3764, 2021, XP011880906.
"Versatile Video Coding," ITU-T Rec. H.266 and ISO/IEC 23090-3, 2023.
D. Marpe, H. Schwarz, and T. Wiegand, "Context-based adaptive binary arithmetic coding in the H.264/avc video compression standard," IEEE Transactions on Circuits and Systems for Video Technology, vol. 13, No. 7, pp. 620-636, 2003.
Johannes Ballé, Philip Chou, David Minnen, Saurabh Singh, Nick Johnston, Eirikur Agustsson, Sung Hwang, and George Toderici, "Nonlinear Transform Coding," IEEE Journal of Selected Topics in Signal Processing, vol. PP, pp. 1-1, 10 2020.
J. Balle, V. Laparra, and E. P. Simoncelli, "End-to-end optimized image compression," in International Conference on Learning Representations (ICLR), Toulon, France, Apr. 2017.
Johannes Balle, David Minnen, Saurabh Singh, Sung Jin Hwang, and Nick Johnston, "Variational image compression with a scale hyperprior," in International Conference on Learning Representations, 2018.
F. Mentzer, E. Agustsson, M. Tschannen, R. Timofte, and L. V. Gool, "Conditional probability models for deep image compression," in 2018 IEEE/CVF Conference on Computer Vision and Pattern Recognition, 2018, pp. 4394-4402.
David Minnen, Johannes Ballé, and George D Toderici, "Joint Autoregressive and Hierarchical Priors for Learned Image Compression," in Advances in Neural Information Processing Systems, S. Bengio, H. Wallach, H. Larochelle, K. Grauman, N. Cesa-Bianchi, and R. Garnett, Eds. 2018, vol. 31, pp. 10771-10780, Curran Associates, Inc.
David Minnen and Saurabh Singh, "Channel-wise autoregressive entropy models for learned image compression," in 2020 IEEE International Conference on Image Processing (ICIP), 2020, pp. 3339-3343.
George Toderici, Sean M. O'Malley, Sung Jin Hwang, Damien Vincent, David Minnen, Shumeet Baluja, Michele Covell, and Rahul Sukthankar, "Variable rate image compression with recurrent neural networks," in 4th International Conference on Learning Representations, ICLR 2016, San Juan, Puerto Rico, May 2-4, 2016, Conference Track Proceedings, Yoshua Bengio and Yann LeCun, Eds., 2016.
F. Yang, L. Herranz, J. v. d. Weijer, J. A. I. Guitin, A. M. López, and M. G. Mozerov, "Variable Rate Deep Image Compression With Modulated Autoencoder," IEEE Signal Processing Letters, vol. 27, pp. 331-335, 2020.
Michael Schäfer, Sophie Pientka, Jonathan Pfaff, Heiko Schwarz, Detlev Marpe, and Thomas Wiegand, "Rate-distortion optimized encoding for deep image compression," IEEE Open Journal of Circuits and Systems, vol. 2, pp. 633-647, 2021, XP011889022.
Michael Schäfer, Sophie Pientka, Jonathan Pfaff, Heiko Schwarz, Detlev Marpe, and Thomas Wiegand, "Rate-distortion-optimization for deep image compression," in 2021 IEEE International Conference on Image Processing (ICIP), 2021, pp. 3737-3741, XP034122827.
T.D. Lookabaugh and R.M. Gray, "High-resolution quantization theory and the vector quantizer advantage," IEEE Transactions on Information Theory, vol. 35, No. 5, pp. 1020-1033, 1989.
Heiko Schwarz, Tung Nguyen, Detlev Marpe, and Thomas Wiegand, "Hybrid video coding with trellis-coded quantization," in 2019 Data Compression Conference (DCC), 2019, pp. 182-191, XP033548461.
Michael W. Marcellin, Margaret A. Lepley, Ali Bilgin, Thomas J. Flohr, Troy T. Chinen, and James H. Kasner, "An overview of quantization in jpeg 2000," Signal Processing: Image Communication, vol. 17, No. 1, pp. 73-84, Jan. 2002.
H. Schwarz, T. Nguyen, D. Marpe, T. Wiegand, M. Karczewicz, M. Coban, and J. Dong, "Improved Quantization and Transform Coefficient Coding for the Emerging Versatile Video Coding (VVC) Standard," in 2019 IEEE International Conference on Image Processing (ICIP), 2019, pp. 1183-1187, XP033642186.
Diederik P. Kingma and Jimmy Ba, "Adam: A Method for Stochastic Optimization," in 3rd International Conference on Learning Representations, ICLR 2015, San Diego, CA, USA, May 7-9, 2015, Conference Track Proceedings, Yoshua Bengio and Yann LeCun, Eds., 2015.
M.W. Marcellin and T.R. Fischer, "Trellis coded quantization of memoryless and gauss-markov sources," IEEE Transactions on Communications, vol. 38, No. 1, pp. 82-93, 1990, XP000102582.
Heiko Schwarz, Muhammed Coban, Marta Karczewicz, Tzu-Der Chuang, Frank Bossen, Alexander Alshin, Jani Lainema, Christian R. Helmrich, and Thomas Wiegand, "Quantization and entropy coding in the versatile video coding (vvc) standard," IEEE Transactions on Circuits and Systems for Video Technology, vol. 31, No. 10, pp. 3891-3906, 2021, XP011880907.
G. D. Forney, "The viterbi algorithm," Proceedings of the IEEE, vol. 61, No. 3, pp. 268-278, 1973.
J. Deng, W. Dong, R. Socher, L.-J. Li, K. Li, and L. Fei-Fei, "ImageNet: A Large-Scale Hierarchical Image Database," in CVPR09, 2009.
"Kodak image dataset," last checked on Jan. 20, 2021, available at http://r0k.us/graphics/kodak/.
G. Bjontegaard, "Calculation of average PSNR differences between RD-Curves," Proceedings of the ITU-T Video Coding Experts Group (VCEG) Thirteenth Meeting.
International Search Report in International application No. PCT/EP2023/069067, mailed on Sep. 15, 2023.
Written Opinion of the International Search Authority in International application No. PCT/EP2023/069067, mailed on Sep. 15, 2023.
Li Binglin et al, Deep Learning-Based Image Compression with Trellis Coded Quantization, 2020 Data Compression Conference (DCC), IEEE, p. 13-22, Mar. 24, 2020.
Karsten Sühring et al, Trellis-Coded Quantization for End-to-End Learned Image Compression, 2022 IEEE International Conference on Image Processing (ICIP), IEEE, p. 3306-3310, Oct. 16, 2022.

ENCODER, DECODER AND METHODS FOR CODING A DATA STRUCTURE

CROSS-REFERENCES TO RELATED APPLICATIONS

This application is a continuation of copending International Application No. PCT/EP2023/069067, filed Jul. 10, 2023, which is incorporated herein by reference in its entirety, and additionally claims priority from European Application No. EP 22 184 232.1, filed Jul. 11, 2022, which is incorporated herein by reference in its entirety.

BACKGROUND OF THE INVENTION

Embodiments of the invention relate to encoders for encoding a data structure, e.g. a picture, e.g. a still picture or a picture of a video sequence. Further embodiments of the invention relate to decoders for reconstructing a data structure e.g. a picture, e.g. a still picture or a picture of a video sequence. Further embodiments relate to methods for encoding a picture into a data stream and to methods for decoding a picture from a data stream.

Some embodiments refer to Trellis-Coded Quantization for End-to-End Learned Image Compression. However, embodiments of the invention may also be used for coding of other data structures than pictures. Further, aspects of the invention may be implemented in systems using other methods than end-to-end learned methods, such as conventional coding methods.

With the advances in machine learning technology in recent years, variational auto-encoders for image and video compression have become a promising re-search area. Traditional image codecs like JPEG [1] or JPEG 2000 [2] are based on transforms which are capable of achieving compact representations of the input image. The framework of transform coding [3] is also used in state-of-the-art video coding technologies like the High Efficiency Video Coding (HEVC) [4, 5] and Versatile Video Coding (VVC) [6, 7]. Here, the residual error after the prediction step is transformed into the frequency domain using orthogonal transforms like discrete cosine transform (DCT), discrete sine transform (DST), or their variations. The resulting transform coefficients are quantized and the quantization indices are entropy coded by using techniques such as context-based adaptive binary arithmetic coding (CABAC) [8]. The quantization parameter, or quantization step size is used to steer how much information gets removed and thus select an operation point with a certain bitrate and accordingly a certain image quality.

While the stated technologies rely on a hybrid, block-based architecture, variational auto-encoders (VAE) for image compression [9] are optimized in an end-to-end fashion. They use non-linear neural networks as replacement of the aforementioned orthogonal transforms and for estimating the distribution of the resulting 3-dimensional representation in the latent space (called features). Typically, different auto-encoders are optimized for specific target bitrates and the features generated by these networks are uniformly quantized before the coding stage. For glossy compression of RGB images, the latest networks of this kind are competitive against conventional technologies in terms of rate-distortion (RD) performance.

The initial works of Balle et al. [10, 11] employ entropy models which estimate the feature distribution without using auto-regressive networks. Different variants of auto-regressive networks for estimating the probabilities at the entropy coding stage are investigated in [12, 13, 14]. However, exploiting spatial (2-D) or additionally inter-channel (3-D) redundancies usually comes at the cost of massively increased computation overhead. Also, different techniques for optimizing VAEs which are capable of achieving various target bitrates are presented in [15, 16, 17]. The aforementioned works employ a scalar uniform quantizer, in which the possible reconstruction levels are uniquely described by a quantization step size. Optimizing the quantization indices of the features with respect to the RD cost is proven to further improve bitrate savings of image compression VAEs after the training stage [17, 18].

Even if the encoder network yields independent features, the compression in the feature domain can be improved by vector quantizers due to the space-filling advantage of the latter [19]. Trellis-coded quantization (TCQ) provides a simple form of vector quantization. By combining different scalar quantizers, it can also be described using a quantization step size parameter. The components of the quantization vectors have similar statistical properties as quantization indexes in scalar quantization, so that state-of-the-art entropy coding methods can be applied [20]. TCQ can be used in JPEG 2000 [21] and has been shown to achieve significant coding gains in Versatile Video Coding (VVC) [20, 22]. To the best of the authors' knowledge, TCQ in the context of auto-encoders has been discussed only in [23]. They optimized VAEs by using a soft quantizer function during the backward-pass whose reconstruction points are determined by the TCQ scheme they use in the inference stage. The resulting VAEs which use TCQ are reported to have higher compression efficiency than the ones using uniform scalar quantization.

Still, there is an ongoing interest in improving the efficiency in coding data structures such as images, e.g. in terms of a relationship between achieved bitrate (or compression rate) and a distortion of the reconstructed data structure.

SUMMARY

An embodiment may have an apparatus for decoding a picture from a data stream, configured for sequentially reconstructing a set of features, wherein the apparatus is configured for reconstructing a feature of the set of features by deriving a quantization index from the data stream using arithmetic decoding, mapping the quantization index to a reconstruction value in dependence on a quantization state, and assigning the reconstruction value to the feature, updating the quantization state in dependence on the quantization index and the quantization state, and using a machine learning predictor for deriving the picture based on the set of features, wherein the apparatus is configured for deriving probabilities for the arithmetic decoding of the quantization index in dependence on the quantization state.

Another embodiment may have an apparatus for encoding a picture into a data stream, configured for using a machine learning predictor for deriving a set of features based on the picture, and sequentially encoding the set of features, wherein the apparatus is configured for encoding a feature of the set of features by deriving a quantization index for the feature in dependence on a quantization state, updating the quantization state in dependence on the quantization index and the quantization state, and encoding the quantization index into the data stream using arithmetic coding, wherein the apparatus is configured for deriving probabilities for the arithmetic coding of the quantization index in dependence on the quantization state.

Another embodiment may have a method for decoding a picture from a data stream, comprising sequentially reconstructing a set of features, wherein the method comprises reconstructing a feature of the set of features by deriving a quantization index from the data stream using arithmetic decoding, mapping the quantization index to a reconstruction value in dependence on a quantization state, and assigning the reconstruction value to the feature, updating the quantization state in dependence on the quantization index and the quantization state, and using a machine learning predictor for deriving the picture based on the set of features, wherein the method comprises deriving probabilities for the arithmetic decoding of the quantization index in dependence on the quantization state.

Embodiments of the invention rely on the idea to encode features of a representation of a data structure sequentially by quantizing a feature in dependence of a quantization state of the encoding process, updating the quantization state in dependence on a quantization index derived for the feature, and arithmetically encoding the quantization index. In particular, embodiments rely on the idea to derive probabilities for the arithmetic encoding of the quantization index in dependence on the quantization state. Similarly, on decoder side, arithmetic decoding is used for decoding the quantization indices, which are mapped to reconstruction values in dependence on a quantization state. The quantization state is updated based on the quantization index and the quantization state. For arithmetically decoding the quantization index, probabilities are derived in dependence on the quantization state. By considering the quantization state in the arithmetic encoding and decoding, the probability distribution associated with different quantization states may be considered in the arithmetic coding, thereby improving the coding efficiency, e.g. in terms of the achieved bitrate. Furthermore, using multiple quantizers allows a better adaption to local properties of the data structure to be encoded. Accordingly, embodiments allow the efficient combination of using multiple quantizers with probability adaptive arithmetic coding, thereby achieving a particularly good rate-distortion relation.

Embodiments of the present invention provide an apparatus for decoding a data structure (e.g., a picture, e.g. a picture of a video) from a data stream, configured for sequentially reconstructing a set of features, wherein the apparatus is configured for reconstructing a (e.g, current) feature of the set of features by deriving a quantization index from the data stream using arithmetic decoding; mapping the quantization index to a reconstruction value in dependence on a quantization state (e.g. a current value of a quantization state variable) (e.g., the quantization state depends on one or more previously decoded quantization indices, e.g. in terms of a sequential updating based on the one or more previously reconstructed features) (E.g., selecting one out of a plurality of quantizers (e.g. two quantizers) based on a quantization state, which depends on one or more previously decoded quantization indices; and mapping the quantization index to the feature in dependence on the selected quantizer (selected for the quantization index)), and assigning the reconstruction value to the feature; updating the quantization state in dependence on the quantization index and the quantization state (e.g. the current quantization state) (e.g., to obtain the quantization state for the reconstruction of a subsequent feature of the set of features (subsequent in terms of a coding order)); and deriving the data structure based on the set of features. The apparatus is configured for deriving probabilities (e.g. respective probabilities for a set of quantization indices, out of which set the quantization index is derived) for the arithmetic decoding of the quantization index in dependence on the quantization state.

Further embodiments of the present invention provide an apparatus for encoding a data structure (e.g., a picture, e.g. a picture of a video) into a data stream, configured for deriving a set of features based on the data structure, and sequentially encoding the set of features, wherein the apparatus is configured for encoding a (current) feature of the set of features by deriving a quantization index for the feature in dependence on a quantization state (e.g. a current value of a quantization state variable) (E.g., selecting one out of a plurality of quantizers (e.g. two quantizers) based on a quantization state, which depends on one or more previously encoded quantization indices; and mapping the feature to a quantization index in dependence on the selected quantizer); updating the quantization state in dependence on the quantization index and the quantization state (e.g. the current quantization state) (e.g., to obtain the quantization state for the encoding of a subsequent feature of the set of features (subsequent in terms of a coding order)); and encoding the quantization index into the data stream using arithmetic coding. The apparatus is configured for deriving probabilities (e.g. respective probabilities for a set of quantization index values, out of which set one value is selected for the quantization index) for the arithmetic coding of the quantization index in dependence on the quantization state.

Further embodiments of the present invention provide a method for decoding a data structure (e.g., a picture, e.g. a picture of a video) from a data stream, comprising sequentially reconstructing a set of features, wherein the method comprises reconstructing a (current) feature of the set of features by deriving a quantization index from the data stream using arithmetic decoding; mapping the quantization index to a reconstruction value in dependence on a quantization state (e.g. a current value of a quantization state variable) (e.g., the quantization state depends on one or more previously decoded quantization indices, e.g. in terms of a sequential updating based on the one or more previously reconstructed features) (E.g., selecting one out of a plurality of quantizers (e.g. two quantizers) based on a quantization state, which depends on one or more previously decoded quantization indices; and mapping the quantization index to the feature in dependence on the selected quantizer (selected for the quantization index)), and assigning the reconstruction value to the feature; updating the quantization state in dependence on the quantization index and the quantization state (e.g. the current quantization state) (e.g., to obtain the quantization state for the reconstruction of a subsequent feature of the set of features (subsequent in terms of a coding order)), and deriving the data structure based on the set of features. The method comprises deriving probabilities (e.g. respective probabilities for a set of quantization indices, out of which set the quantization index is derived) for the arithmetic decoding of the quantization index in dependence on the quantization state.

Further embodiments of the present invention provide a method for encoding a data structure (e.g., a picture, e.g. a picture of a video) into a data stream, comprising deriving a set of features based on the data structure, and sequentially encoding the set of features, wherein the method comprises encoding a (current) feature of the set of features by deriving a quantization index for the feature in dependence on a quantization state (e.g. a current value of a quantization state variable) (E.g., selecting one out of a plurality of quantizers (e.g. two quantizers) based on a quantization state, which depends on one or more previously encoded quantization indices; and mapping the feature to a quantization index in dependence on the selected quantizer); updating the quantization state in dependence on the quantization index and the quantization state (e.g. the current quantization state) (e.g., to obtain the quantization state for the encoding of a subsequent feature of the set of features (subsequent in terms of a coding order)); and encoding the quantization index ($q_n$) into the data stream using arithmetic coding. The method comprises deriving probabilities (e.g. respective probabilities for a set of quantization index values, out of which set one value is selected for the quantization index) for the arithmetic coding of the quantization index in dependence on the quantization state.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings, in which the same or similar elements or elements that have the same or similar functionality have the same reference signs assigned or are identified with the same name. It should be appreciated that the embodiments provide many applicable concepts that can be embodied in a wide variety of coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

Further, it is noted, that details and features described with respect to a decoder, may equivalently apply to corresponding features of a corresponding encoder and vice versa. For example, the described updating of the quantization state, the derivation of the probabilities for the arithmetic coding/decoding, may be performed equivalently on encoder and decoder sides.

Figure 1:
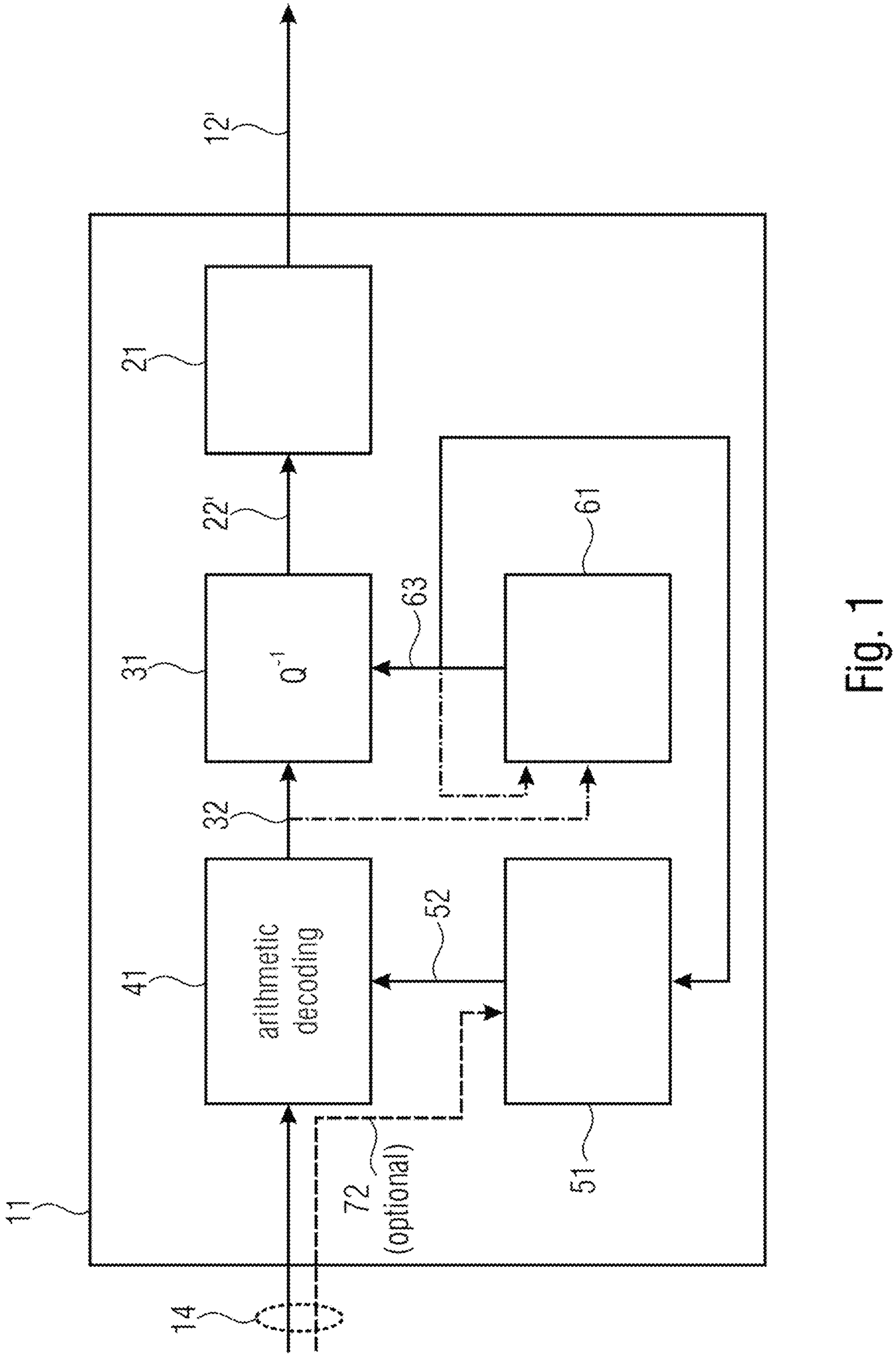
FIG. 1 illustrates an apparatus for decoding a data structure according to an embodiment.
Figure 2:
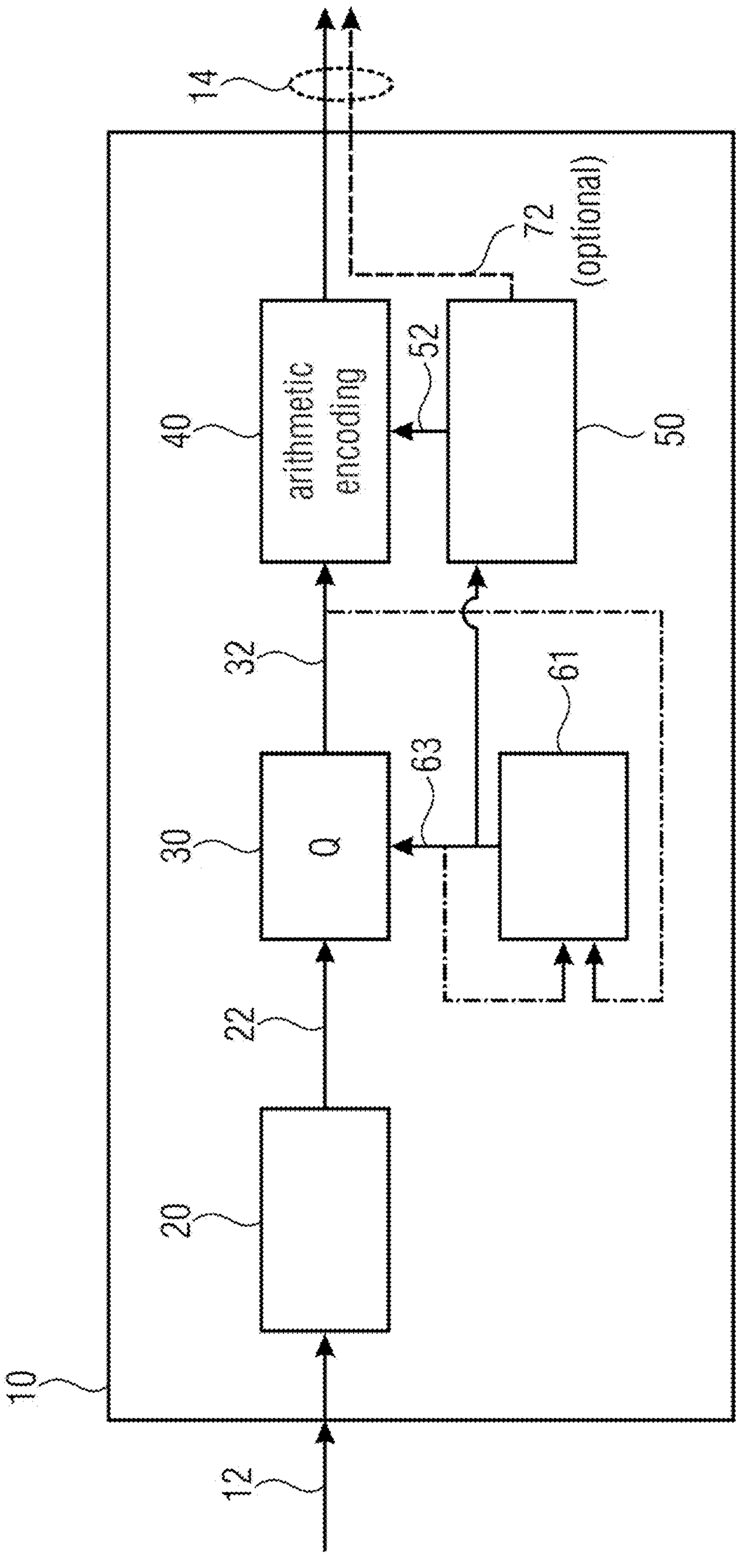
FIG. 2 illustrates an apparatus for encoding a data structure according to an embodiment.

FIG. 1 illustrates an apparatus for decoding a data structure 12' from a data stream 14. The apparatus, also referred to as decoder, is indicated using reference sign 11. FIG. 2 illustrates a corresponding encoder 10, i.e. an apparatus 10 configured for encoding the data structure 12 into a data stream 14, wherein the apostrophe has been used to indicate that the data structure 12' as reconstructed by the decoder 11 may deviate from data structure 12 originally encoded by apparatus 10 in terms of coding loss, e.g. quantization loss introduced by quantization and/or a reconstruction error.

For example, the data structure 12, 12' is a picture, e.g. a picture of a video.

Encoder 10 is configured for deriving, e.g. by block 20 of FIG. 2, which may represent an encoding stage of encoder 10, a set of features 22 based on the data structure 12. For example, the set of features is a representation of the data structure 12. In examples, the encoding stage 20 may use a trained machine learning model to obtain the set of features based on the data structure.

Encoder 10 sequentially encodes the set of features 22, e.g. according to a coding order of the features 22, wherein the apparatus is configured for encoding a feature 22 of the set of features, e.g. a current feature (e.g., $z_n$ in the notation below), by deriving, e.g. in block 30 of FIG. 2, which may be referred to as quantizer, a quantization index 32 (e.g., $q_n$ in the notation below) for the feature 22, e.g. the current feature. Encoder 10 derives the quantization index 32 for the feature 22 in dependence on a quantization state 63 (e.g., $s_n$ in the notation below). For example, the quantization state 63 is a current value of a quantization state variable. E.g., encoder 10 may select one out of a plurality of quantizers, e.g. two quantizers (e.g., $Q_0$, $Q_1$ in the notation below) based on a quantization state, which depends on one or more previously encoded quantization indices; and encoder 10 may map the feature to a quantization index in dependence on the selected quantizer.

Encoder 10 is further configured for updating, e.g. in block 61, which may be referred to as state machine, the quantization state 63 in dependence on the quantization index 32, e.g. the quantization index determined for the current feature 22, and in dependence on the quantization state 63, e.g. the current quantization state, e.g., to obtain the quantization state for the encoding of a subsequent feature of the set of features (subsequent in terms of a coding order).

This may mean, for example, after deriving the quantization index for the current feature using the quantization state, encoder 10 updates the quantization state using the current value of the quantization state and the just determined quantization index for the current feature.

Encoder 10 further comprises an arithmetic encoding block 40, which encodes the quantization index 32 into the data stream using arithmetic coding.

Encoder 10 is configured for deriving probabilities 52 (e.g. respective probabilities for a set of quantization index values, out of which set one value is selected for the quantization index) for the arithmetic coding 40 of the quantization index 32 in dependence on the quantization state. Deriving the probabilities 52 may be performed by the probability modeling block 50, also referred to as probability modeler 50.

Now reverting to FIG. 1, decoder 11 is configured for sequentially reconstructing a set of features 22' (e.g. $\hat{z}$ in the notation below), wherein, again, the apostrophe may be used to indicate that features 22' may differ from features 22 in terms of coding loss, e.g., quantization loss. Decoder 11 comprises an arithmetic decoding block 41. Decoder 11 is configured for reconstructing a feature 22' of the set of features, e.g. a current feature, by deriving, e.g. in block 41 of FIG. 1, a quantization index 32 from the data stream using arithmetic decoding. Accordingly, the quantization index may be referred to as current quantization index.

Decoder 11 maps, e.g. in block 31, which may be referred to as dequantizer, the quantization index 32 to a reconstruction value in dependence on a quantization state 63 (e.g., $s_n$ in the notation below). E.g., the quantization state 63 is a current value of a quantization state variable. E.g., the quantization state depends on one or more previously decoded quantization indices, e.g. in terms of a sequential updating based on the one or more previously reconstructed features. As already mentioned with respect to the encoder, 10, decoder 11 may select one out of a plurality of quantizers, e.g. two quantizers, (e.g., $Q_0$, $Q_1$ in the below notation) based on a quantization state, which depends on one or more previously decoded quantization indices; and mapping the quantization index to the feature in dependence on the selected quantizer (selected for the quantization index, e.g., the current quantization index). Decoder 11 may assigning the reconstruction value to the feature, e.g. the current feature.

Decoder 11 further comprises a block 61 configured for updating the quantization state in dependence on the quantization index (e.g., the current quantization index, e.g. $q_n$) and the quantization state (e.g., the current quantization state, $s_n$), e.g., to obtain the quantization state for the reconstruction of a subsequent feature of the set of features (subsequent in terms of a coding order). Again, block 61 may be referred to as state machine. State machine 61 may operate in the same manner as state machine 61 of encoder 10.

Decoder 11 further comprises a decoding block 21, which derives the data structure 12' based on the set of features 22'. Decoder 11 is configured for deriving probabilities 52 (e.g. respective probabilities for a set of quantization indices, out of which set the quantization index is derived) for the arithmetic decoding of the quantization index 32 in dependence on the quantization state 63. Deriving the probabilities 52 may be performed by probability modeling block 51 as illustrated in FIG. 1, also referred to as probability modeler 51.

For example, decoder 11 is configured for sequentially reconstructing the features of the set of features according to a coding order.

According to an embodiment, each of the features 22 of the set of features is associated with a respective position of one of one or more arrays. For example, the set of features form a representation of the data structure, wherein each of the one or more array is a partial representation of the data structure, and the one or more arrays jointly form a representation of the data structure, e.g., the one or more arrays may comprise arrays of different sizes; e.g., sizes w×h, w/2×h/2, and w/4×h/4, as described in equation (1) below. For example, the arrays may be the result of transforming the original data structure with a machine learning predictor, e.g. as described with respect to FIG. 9.

In embodiments, decoder 11 may sequentially reconstruct the one or more arrays (i.e. subsets of features of the set of features 22, each subset being associated with one of the arrays) according to a coding order among the arrays. Additionally or alternatively, decoder 11 may sequentially reconstruct the features of the one or more arrays according to respective raster scan orders defined within the one or more arrays.

That is, for example, the scan order may refer to one or both of an order among the features and an order among subsets of features, which subsets are associated with respective arrays.

According to embodiments, in which the features are associated with array as described above, the decoder 11 may use respective initial quantization states as the quantization states for the reconstruction of respective first features of the one or more arrays (e.g., the first features according the raster scan orders within the arrays).

That is, for example, the state machine 61 may be initialized at the beginning of a decoding of each of the one or more arrays. An individual initialization of the state machine for each of the arrays may allow for an independent decoding of the arrays, which may be exploited for a parallelization of the arithmetic decoding performed by arithmetic decoder 41.

For example, the initial quantization states are predetermined, or wherein the apparatus is configured for deriving the initial quantization states from the data stream 14.

According to an embodiment, independent of a subdivision of the set of features into array, decoder 11 may derive the quantization state for the reconstruction of a first feature of the set of features 22 (e.g., the first feature according to the coding order or raster scan order) from the data stream. Alternatively, decoder 11 may use a predetermined state as the quantization state for the reconstruction of the first feature of the set of features (e.g., the first feature according to the coding order or raster scan order).

According to an embodiment, dequantizer 31 uses a quantization parameter, e.g. parameter Δ described below, for mapping the quantization index to the reconstruction value. In examples, decoder 11 may derive the quantization parameter from the data stream 14.

For example, the quantization parameter may be a quantization step size.

For example, the mapping performed by the dequantizer 31 may be a function of the quantization step size, the quantization state 63, and the quantization index 32, and optionally an offset, which offset may, for example, be a function of a parametrization of a probability model of the arithmetic decoding 41. An example for a mapping function is given below in the section "Coding of Quantization Indexes".

In examples, the quantization parameter is fixed for all features of the set of features 22. Alternatively, the quantization parameter may be different for different arrays of the set of features, and respective quantization parameters may be derived from the data stream.

According to an embodiment, state machine 61 may perform the updating of the quantization state in a manner depending on a parity of the quantization index (e.g. the current quantization index, i.e. the one for the reconstruction of the current feature). An example of the state machine 61 is described with respect to FIG. 11B below.

Figure 3:
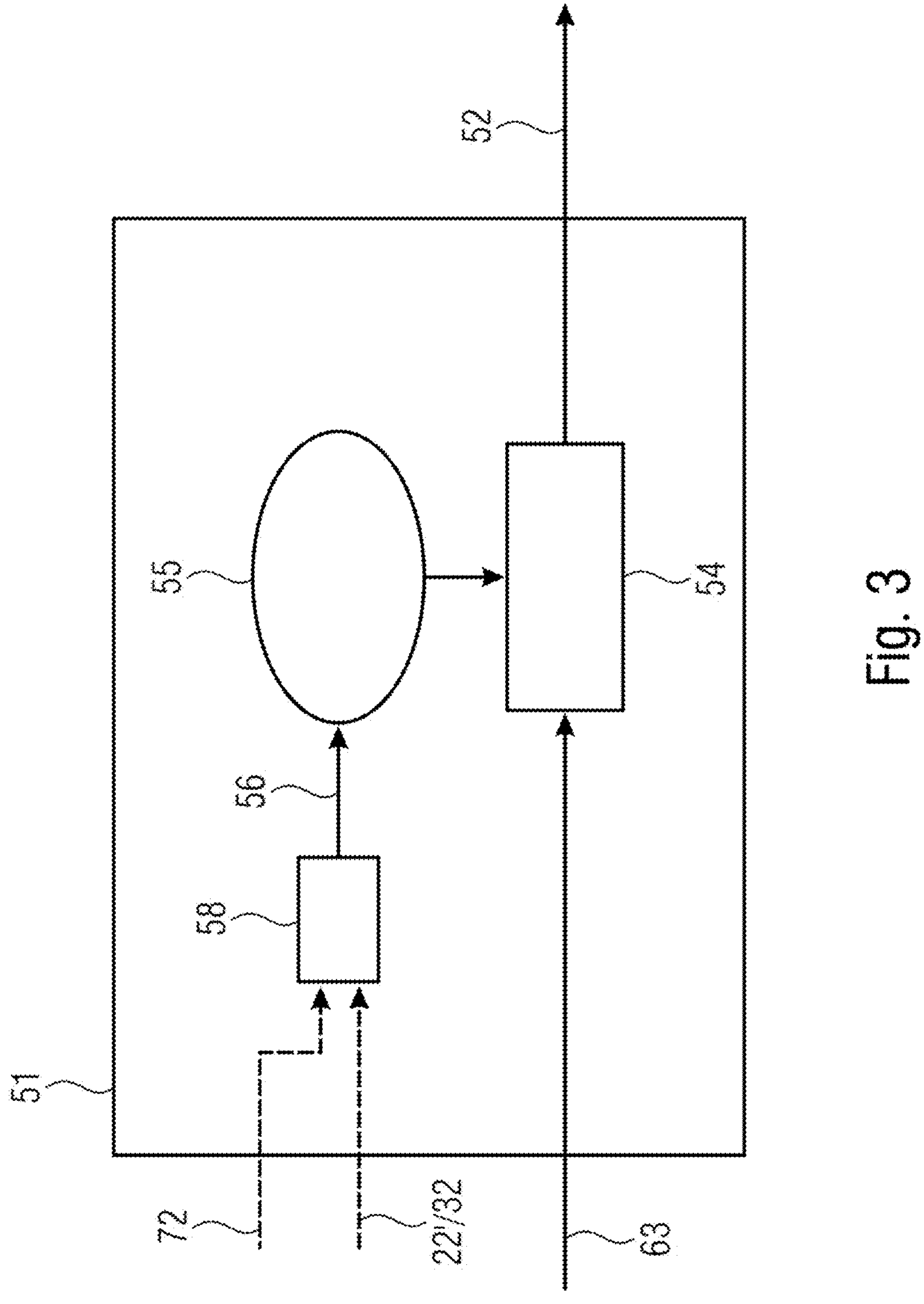
FIG. 3 illustrates a probability modeler of a decoder according to an embodiment.

FIG. 3 illustrates an example of the probability modeler 51 according to an embodiment. According to this embodiment, probability modeler 51 derives the probabilities 52 for the arithmetic decoding 41 of the quantization index 32 based on a probability model 55. According to this embodiment, decoder 11 may derive, e.g. by means of parametrization block 58 of FIG. 3, a parametrization 56 (e.g., an of the notation below) of the probability model. For example, the probability model may be a probability density function, e.g. representing, or estimating, a probability distribution of the (currently reconstructed) feature. In examples, probability modeler 51 may derive respective probabilities for a set of quantization index features, which, e.g., the quantization index 32 may have.

In examples, the parameterization 56 is predetermined.

In alternative examples, parameterization block 58 derives the parametrization 56 from the data stream 14.

As indicated in FIG. 3, parametrization block 58 may derive the parametrization 56 of the probability model in dependence on one or more previously reconstructed features 22' and/or one or more previously decoded quantization indices 32, for example, in dependence on one or more previously reconstructed features and/or one or more previously decoded quantization indices associated with positions in a region around a position of the currently reconstructed feature. E.g., the positions refer to positions in one or more arrays. E.g., the region includes one or more positions within the array to which the currently reconstructed feature is associated.

Figure 4:
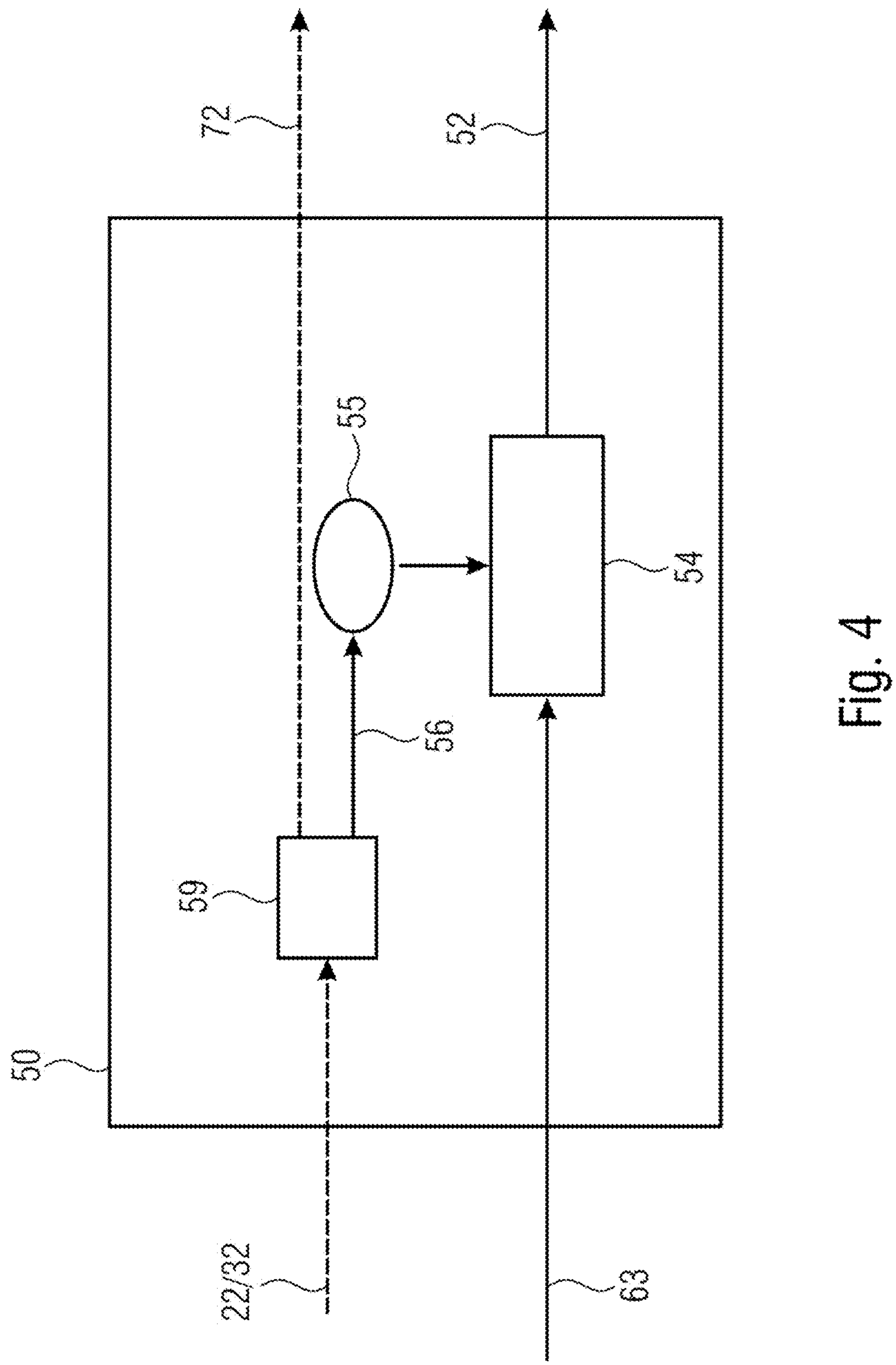
FIG. 4 illustrates a probability modeler of an encoder according to an embodiment.

FIG. 4 illustrates an example of the probability modeler 50 of encoder 10 according to an embodiment. Probability modeler 50 of FIG. 4 may form the encoder-sided counterpart of probability modeler 51 of FIG. 3. According to the embodiment of FIG. 4, probability modeler 50 derives the probabilities 52 for the arithmetic coding 40 of the quantization index 32 based on probability model 55, e.g. the one of FIG. 3. According to this embodiment, encoder may comprise a parameterization block 59, which may derive a parametrization 56, e.g. 10 the one of FIG. 3, e.g. an in the notation below, of the probability model 55. In examples, probability modeler 50 may derive respective probabilities for a set of quantization index features, which, e.g., the quantization index may have.

In examples, encoder 10 encodes the parametrization 56 of the probability model 55 into the data stream. For example, encoder 10 may encode an indication of the parametrization 56 to be used for the arithmetic decoding 41 of the (current) quantization index 32 into the data stream.

As indicated in FIG. 4, parametrization block 59 may derive the parametrization 56 of the probability model in dependence on one or more previously encoded features and/or one or more previously encoded quantization indices, e.g., in dependence on one or more previously encoded features and/or one or more previously encoded quantization indices associated with positions in a region around a position of the currently encoded feature. E.g., the positions refer to positions in one or more arrays. E.g., the region includes one or more positions within the array to which the currently encoded feature is associated.

Figure 5:
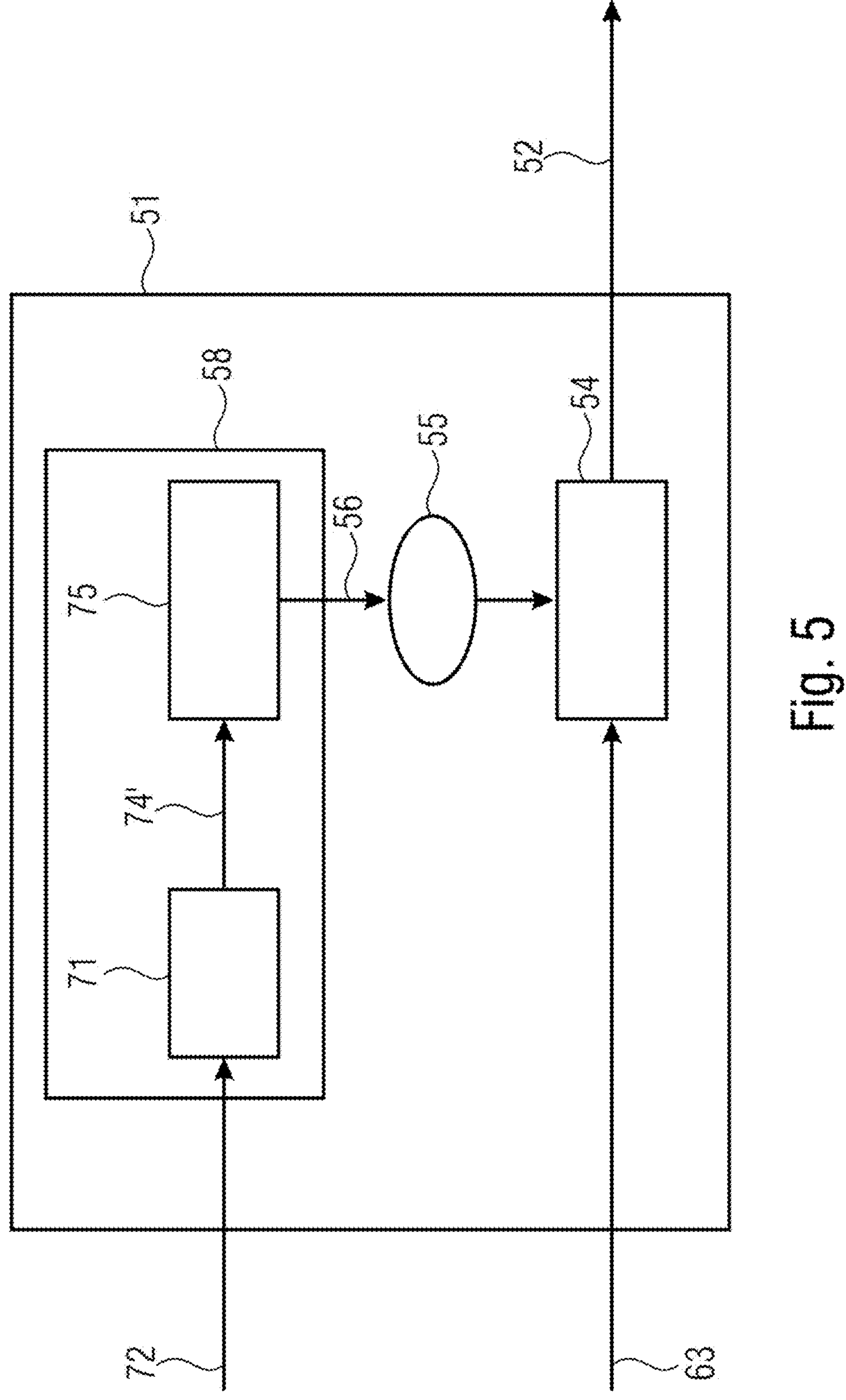
FIG. 5 illustrates details of an example of the probability modeler of FIG. 3.

FIG. 5 illustrates a more detailed example of the probability modeler 51 of FIG. 3, and in particular, of the parametrization block 58. According to the embodiment of FIG. 5, parametrization block 58 comprises a decoding block 71, which decodes a set of hyper parameters 74' from the data stream 14. To this end, decoding block 71 may receive side information 72 comprised in the data stream, as it is also indicated in FIG. 1. According to the embodiment of FIG. 5, parametrization block 58 further comprises a block 75 in which the parametrization 56 is derived based on the hyper parameters 74'. To this end, a machine learning predictor is used in block 75.

Figure 10:
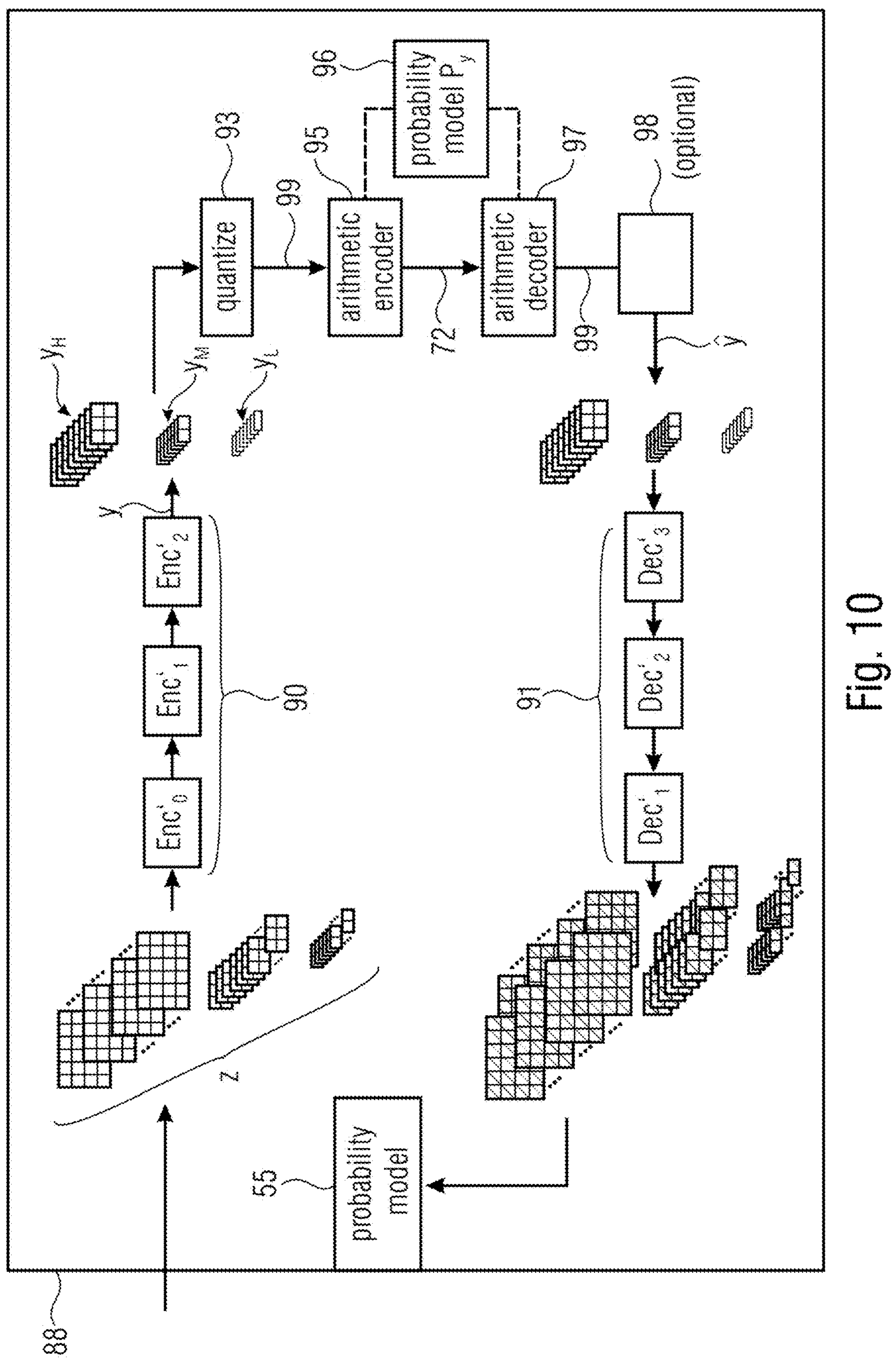
FIG. 10 illustrates a flow chart of a hyper system for the coding scheme of FIG. 9 according to an embodiment.

For example, the machine learning predictor of block 75 may be a neural network, e.g., referred to as hyper decoder, e.g. $\mathrm{Dec}'_{1\text{-}3}$ of FIG. 10, e.g. a further neural network additional to the decoding network Dec. E.g., the machine learning predictor receives as an input the set of hyper parameters 74'. The set of hyper parameters may, e.g., represent probability distributions of the features 22. The machine learning predictor may be a convolutional neural network, e.g. trained end-to-end to optimize a rate-distortion measure, e.g., with respect to a predetermined rate, by encoding and reconstructing data structures and determining respective rate-distortion measures.

Figure 6:
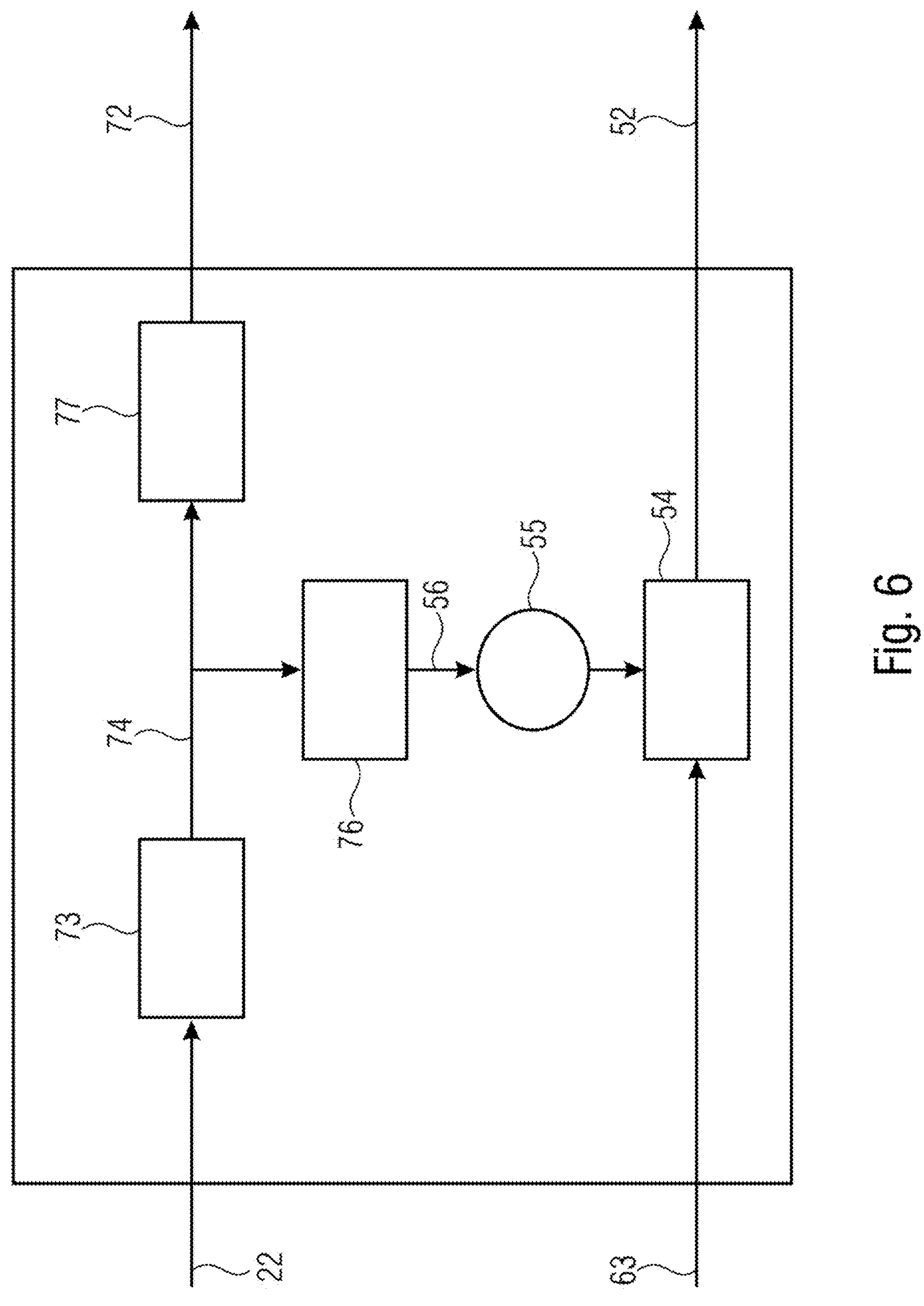
FIG. 6 illustrates details of an example of the probability modeler of FIG. 4.

FIG. 6 illustrates a more detailed example of the probability modeler 50 of FIG. 4, and in particular, of the parametrization block 59. According to the embodiment of FIG. 6, parametrization block 59 comprises a block 73, in which a machine learning predictor, e.g., a neural network, e.g. a convolutional neural network, e.g., referred to as hyper encoder, e.g. $\mathrm{Enc}'_{1\text{-}3}$ of FIG. 10, for deriving a set or hyper parameters 74 based on the set of features 22. The hyper parameters 74 are encoded into the data stream 14 as side information 72 by means of encoding block 77. A further block 76 of the parameterization block 59 uses a further machine learning predictor for deriving the parametrization of the probability model based on the hyper parameters. For example, the further machine learning predictor of block 76 may correspond to the hyper decoder of block 75 of FIG. 5.

For example, the further machine learning predictor receives as an input the set of hyper parameters 74, the set of hyper parameters 74 may, e.g., represent probability distributions of the features; The further machine learning predictor may be a convolutional neural network, e.g. trained end-to-end to optimize a rate-distortion measure, e.g., with respect to a predetermined rate, by encoding and reconstructing data structures and determining respective rate-distortion measures, wherein for the encoding and decoding of the data structure, probabilities for the arithmetic encoding and decoding of the quantization indices are derived based on the hyper parameters.

Encoding 77 and decoding 71 of the hyper parameters 74 may introduce coding loss, such as quantization loss, such that hyper parameters 74' may differ from hyper parameters 74 in terms of coding loss. In examples, the further machine learning predictor may receive hyper parameters 74' as an input, i.e., block 76 may derive hyper parameters 74' based on hyper parameters 74, e.g. by performing encoding and decoding as performed by blocks 77 and 71 of FIG. 5 and FIG. 6.

According to an embodiment of the parametrization blocks 58, 59 of FIG. 3 and FIG. 4, which may optionally be combined with the features described with respect to FIG. 5 and FIG. 6, respectively, parametrization blocks 58, 59 derive a respective parametrization 56 of the probability model for each of the features of the set of features 22, 22'. For example, parametrization block 58 derives an individual parametrization for each of the features from the data stream, e.g. based on the set of hyper parameters.

According to an alternative embodiment of the parametrization blocks 58, 59, each of the features of the set of features is associated with a respective position of one of one or more arrays (e.g. the set of features form a representation of the data structure, wherein each of the one or more array is a partial representation of the data structure, and the one or more arrays jointly form a representation of the data structure, e.g., the one or more arrays may comprise arrays of different sizes), and wherein the parametrization blocks 58, 59 derive a respective parametrization 56 of the probability model for each of the arrays. For example, parametrization block 58 may derive a parametrization for each of the arrays from the data stream, e.g. based on the set of hyper parameters, e.g. using one parametrization for all features of one array. Similarly parametrization block 59 may encode one parametrization for all features of the array into the data stream.

In the following, further details of probability modelers 50, 51 of encoder 10 and decoder 11 of FIG. 4 and FIG. 3 are described, in particular of block 54, which derives the probabilities 52 based on the probability model 55. Features described with respect to FIG. 5 and FIG. 6 may optionally be combined with the details described in the following.

According to an embodiment, probability modeler 51 derives the probabilities 52 for the arithmetic decoding 41 of the quantization index 32 by evaluating, cf. block 54 of FIG. 5 and FIG. 6, the probability model 55 within respective boundaries for a set of quantization index values (e.g., possible values for the quantization index). Encoder 10 and decoder 11, e.g. in block 54, derive the boundaries in dependence on the quantization state and the parametrization of the probability model.

For example, the probability model 55 is a probability mass function, and block 54 derives the probabilities 52 by integrating the probability mass function within the boundaries, e.g. as described with respect to equation 8 below.

For example, the probability model is evaluated individually for each quantization index of the set of quantization index values, and the boundaries for evaluating the probability model may be determined individually for each of the quantization index values of the set.

For example, the set of quantization index values may depend on the current quantization index 32.

According to an embodiment, the boundaries are the midpoints between reconstruction values associated with two neighboring quantization index values.

According to an alternative embodiment, the boundaries are shifted with respect to (or differ from, e.g. have a higher distance to a mean of the probability model than) the midpoints between reconstruction values associated with two neighboring quantization index values in dependence on the respective quantization index value and/or in dependence on the quantization state. Shifting the boundaries may allow for a beneficial exploitation of the probability distribution with respect to a coding length of the quantization indices. For example, as described below, the offset, by which the boundaries are shifted, may represent the mean of the probability density function, so that a quantization index of value 0 is associated with a reconstruction value corresponding to the mean of the probability density function.

An example for deriving the probabilities based on an evaluation of a probability density function, optionally within variable boundaries, is described below in section "Coding of Quantization Indexes", see equation (8) and following.

In examples of the above-described embodiments, the arithmetic encoding/decoding may be a multi-symbol arithmetic encoding/decoding. That is, the probability model may yield a probability for each of a set of quantization index values, e.g. a set of more than two different values, which set may be specific to the current quantization index. In examples, the set may depend on the quantization state.

But, also in the above-described examples, the arithmetic coding is not necessarily of the multi-symbol type, but may be a binary arithmetic coding.

In the following, an optional variant of the arithmetic encoding 40 and decoding 41 described with respect to FIG. 2 and FIG. 1 is described, according to which, the arithmetic coding is a binary arithmetic encoding/decoding.

For example, the decoder 11 may decode a binary representation of the quantization index 32 from the data stream 14 using binary arithmetic decoding and may map the binary representation to a quantization index value for the quantization index 32 based on a binarization scheme. Similarly, encoder 10 may map a value of the quantization index 32 to be encoded onto a binary representation using a binarization scheme and arithmetic encoder 40 may encode the binary representation of the quantization index 32 into the data stream using binary arithmetic coding.

According to an embodiment, the arithmetic decoding is a binary arithmetic decoding, and wherein the apparatus is configured for deriving the probabilities for the binary arithmetic decoding of the quantization index based on probabilities for a set of quantization index values, and deriving the probabilities for the set of quantization index values based on a probability model (e.g., the probability model 55 described with respect to FIGS. 3 to 6).

Similarly, according to this embodiment, the arithmetic encoding 40 may be a binary arithmetic encoding. In this embodiment, encoder 11 may derive the probabilities for the binary arithmetic encoding of the quantization index 32 based on probabilities for a set of quantization index values, e.g., a respective probability for each quantization index value of the set, and encoder 11 may further derive the probabilities for the set of quantization index values based on a probability model (e.g., the probability model mentioned before).

Accordingly, in an example of this embodiment, the probability model may be a multi-symbol model (e.g. indicating probabilities for more than two possible values of the quantization index) and the probabilities for the binary arithmetic coding of a quantization index value are derived from the probability for the quantization index value, which probability is derived from the probability model 55. Accordingly, the details described with respect to FIGS. 3 to 6 may also apply to these implementations.

According to alternative embodiments, the probability model may be a binary model.

According to an embodiment, decoder 11 may derive the probabilities 52 for the binary arithmetic decoding of a binary representation of the quantization index in dependence on one or more of

- an index of a currently decoded bin of the binary representation (e.g., the index indicating a position within the binary representation),
- the quantization state 63,
- a set of hyper parameters decoded from the data stream,
- one or more previously reconstructed features and/or one or more previously decoded quantization indices (e.g., in dependence on one or more previously reconstructed features and/or one or more previously decoded quantization indices associated with positions in a region around a position of the currently reconstructed feature. E.g., the positions refer to positions in one or more arrays. E.g., the region includes one or more positions within the array to which the currently reconstructed feature is associated).

For example, probability modeler 51 may derive the probabilities 52 based on hyper parameters 74' as described with respect to FIG. 5.

Similarly, according to an embodiment, encoder 11 may derive the probabilities 52 for the binary arithmetic encoding 40 of a binary representation of the quantization index 32 (e.g., for the individual bins of the binary representation) in dependence on one or more of an index of a currently coded bin of the binary representation (e.g., the index indicating a position within the binary representation), the quantization state 63, a set of hyper parameters obtained from the set of features, e.g. by means of a machine learning predictor, (hyper encoder) e.g. a neural network, one or more previously encoded features 22' and/or one or more previously encoded quantization indices 32 (e.g., in dependence on one or more previously encoded features and/or one or more previously encoded quantization indices associated with positions in a region around a position of the currently encoded feature. E.g., the positions refer to positions in one or more arrays. E.g., the region includes one or more positions within the array to which the currently encoded feature is associated).

For example, probability modeler 50 may derive the probabilities 52 based on hyper parameters 74 as described with respect to FIG. 6.

According to an alternative embodiment, decoder 11 derives the probabilities 52 for the binary arithmetic decoding 41 of a bin of a binary representation of the quantization index by selecting a machine learning predictor out of a set of machine learning predictors (e.g., neural networks, e.g. additional ones to the decoding network, cf. below) based on the quantization state and/or an index of the bin. Decoder 11 uses the selected further machine learning predictor for deriving the probabilities based on a set of hyper parameters (e.g., hyper parameters 74' as described with respect to FIG. 5. E.g., the apparatus is configured for decoding the set of hyper parameters from the data stream 14) and/or one or more previously reconstructed features 22' and/or one or more previously decoded quantization indices 32 (e.g., in dependence on one or more previously reconstructed features and/or one or more previously decoded quantization indices associated with positions in a region around a position of the currently reconstructed feature. E.g., the positions refer to positions in one or more arrays. E.g., the region includes one or more positions within the array to which the currently reconstructed feature is associated).

For example, the machine learning predictors may be trained with respect to different subsets of the features, which subsets are defined by the quantization state and/or the index of the bin. Accordingly, the machine learning predictors may be adapted to different source statistics, thereby providing more accurate probabilities.

Similarly, according to an embodiment, encoder 10 derives the probabilities 52 for the binary arithmetic encoding 40 of a bin of a binary representation of the quantization index 32 by selecting a machine learning predictor out of a set of machine learning predictors (e.g., neural networks, e.g. additional ones to the one which may be used for deriving the set of features 22 from the data structure (the encoding network), and the one which may be used for reconstructing the data structure based on encoded values of the features (the decoding network)) based on the quantization state 63 and/or an index of the bin. Decoder 11 may then use the selected machine learning predictor for deriving the probabilities based on a set of hyper parameters (e.g., the apparatus is configured for obtaining the hyper parameters based on the features using a neural network, e.g. the hyper encoder, and encoding the set of hyper parameters into the data stream) and/or one or more previously encoded features and/or one or more previously encoded quantization indices (e.g., in dependence on one or more previously encoded features and/or one or more previously encoded quantization indices associated with positions in a region around a position of the currently encoded feature. E.g., the positions refer to positions in one or more arrays. E.g., the region includes one or more positions within the array to which the currently encoded feature is associated).

In the following, further optional features are described, which relate to any of the above described embodiments.

According to an embodiment, probability model 55 is a Gaussian distribution, and wherein the parametrization 56 comprises a first parameter indicating the mean and a second parameter indicating the variance of the Gaussian distribution.

As far as the dequantizer 31 is concerned, according to an embodiment, the dequantizer derives the quantization index for the feature depends on the quantization state and the parametrization of the probability model.

The decoding block 21, according to an embodiment, uses a machine learning predictor (e.g. a neural network, e.g. a convolutional neural network, e.g., referred to as decoding network, e.g. $Dec_{1-3}$) for deriving the data structure based on the set of features 22' ($\hat{z}$ in the notation below). E.g., decoding block 21 uses the set of features as input for the machine learning predictor.

Figure 7:
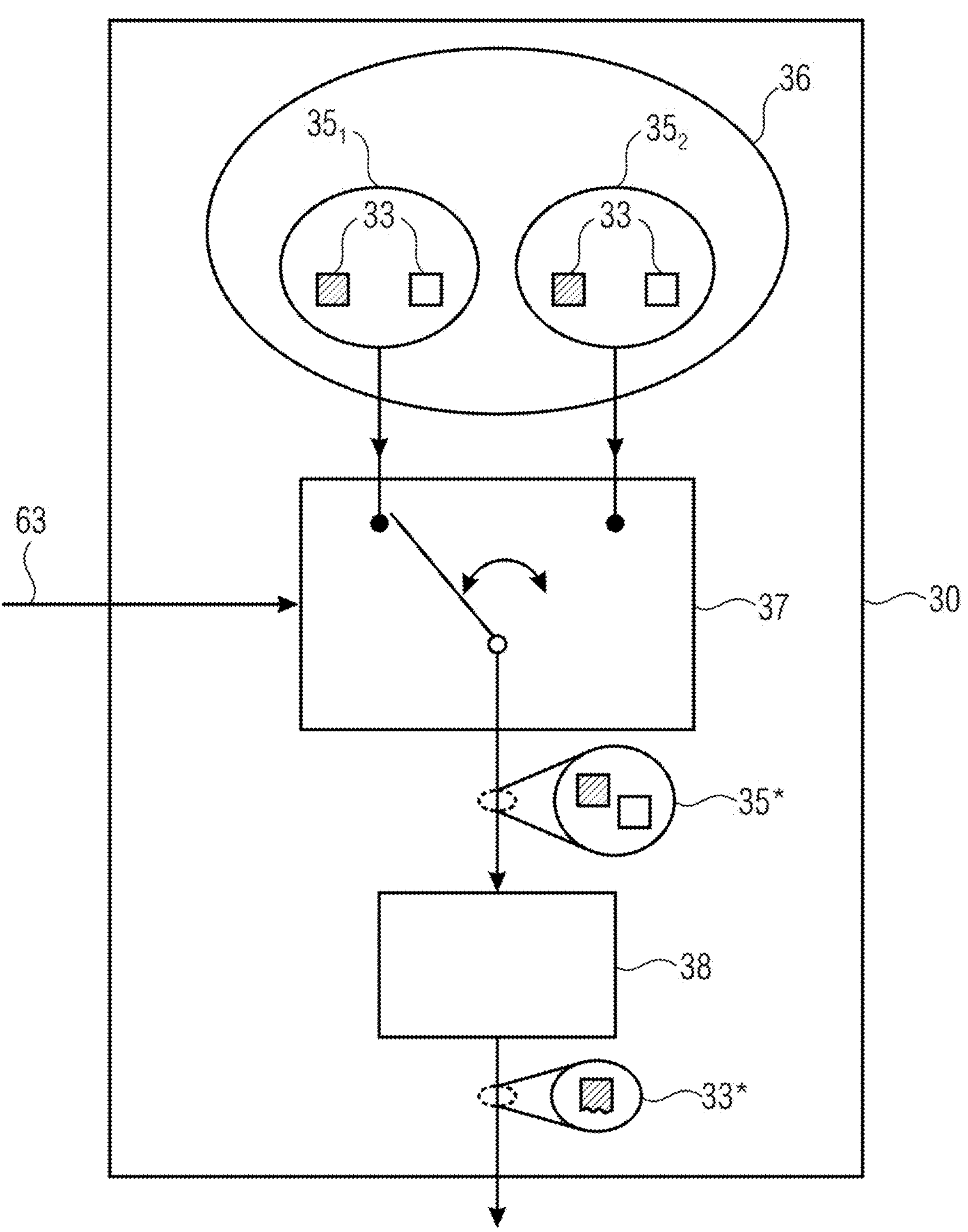
FIG. 7 illustrates a quantizer according to an embodiment.

FIG. 7 illustrates an implementation of quantizer 30 according to an embodiment. In this embodiment, encoder 10 encodes the features 22 of the set of features sequentially according to a coding order. Quantizer 30 derives the quantization index 32 for the feature, e.g. the currently coded feature 22 by selecting, by means of block 37 illustrated in FIG. 7, one set 35* of quantization index values 33 out of a plurality 36 of sets 35 of quantization index values 33. For example, the plurality 36 of sets of quantization index values may comprise two sets 35, as exemplarily illustrated in FIG. 7 by sets $35_1$, $35_2$, but a higher number is also possible. For example, each of the sets 35 of quantization index values comprises a plurality of quantization index values, e.g. two or more quantization index values. Quantizer 37 selects the set of quantization index values based on the quantization state 63.

According to the embodiment of FIG. 7, quantizer 30 further selects, e.g. by means of block 38 illustrated in FIG. 7, one quantization index value 33* out of the selected set 35* of quantization index values 33 for the quantization index 32 for the feature 22.

In selecting the quantization index value 33* for the feature 22, e.g., the current one, (and, e.g, in doing so for the features 22 according to the coding order) encoder 10 defines a decision path, according to which each of the features is associated with one of the quantization index values 33 of one of the sets of quantization index values.

According to an embodiment, state machine 61 performs the updating of the quantization state 63 according to an update scheme (e.g. according a Trellis coded quantization state machine, e.g. as shown in Table 1 below) so that, in dependence on the quantization index 32 (e.g. the quantization index value 33 selected for the current feature), the updating of the quantization state 63 results in a quantization state, which is indicative of the same set out of the sets of quantization index values or a different set out of the sets of quantization index values compared to the previous quantization state (i.e. the one before the update). That is, the previous quantization state may refer the quantization state, based on which the quantization index value for the current feature is selected, and the updated one refers to the quantization state after updating the quantization state based on the quantization index value selected for the current feature.

According to an embodiment, each of the sets 35 of quantization index values comprises a plurality of subsets of quantization index values (e.g., the sets are subdivided into the subsets), wherein each quantization index value of one of the sets is affiliated to one of the subsets of the set. According to this embodiment, the state machine 61 updates the quantization state 63 in dependence on the quantization state 63 and in dependence on the affiliation of the quantization index (e.g. the quantization index value selected for the quantization index) with respect to the subsets of quantization index values.

For example, in the set $\mathbf{35}_1$ illustrated in FIG. 7, the quantization index value illustrated as hatched box may be affiliated to a first subset and the quantization index value illustrated as clear box may be affiliated to a second subset of the set $\mathbf{35}_1$. In this example, state machine 61 updates the quantization state 63, e.g., selects the next value for the quantization state 63, depending on whether the selected quantization state value 33* belongs to the first subset or the second subset. It is noted that the number of two quantization state values per set 35 of quantization state is merely an example, and the sets 35 may comprise more than two quantization state values. Further, the number of two subsets per set 35 of quantization state values is exemplarily and may be larger than two.

According to an embodiment, the number of sets 35 of quantization index values is two, and wherein the number of subsets of quantization index values of each of the sets of quantization index values is two, so that the number of different quantization states is four, e.g. as described with respect to FIG. 11A, 11B below.

According to an embodiment, the quantization index values of each of the two sets of quantization index values are subdivided into the respective subsets of the sets according to the parity of quantization index values. For example, a quantization index value of zero may belong to one or the other or both subsets.

As far as the selection 38 of the quantization index value out of the selected set 35* of quantization index values is concerned, encoder 10 may perform the selection by optimizing the decision path with respect to a rate-distortion measure, e.g., using an optimization algorithm, e.g., a Viterbi algorithm. For example, the rate-distortion measure is based on the bitrate, or an estimate thereof, resulting from the arithmetic coding of the data structure 14, or the features 22, and is based on an estimate for a distortion of a reconstruction of the data structure, which reconstruction is based on the quantization indices selected for the features.

Figure 8:
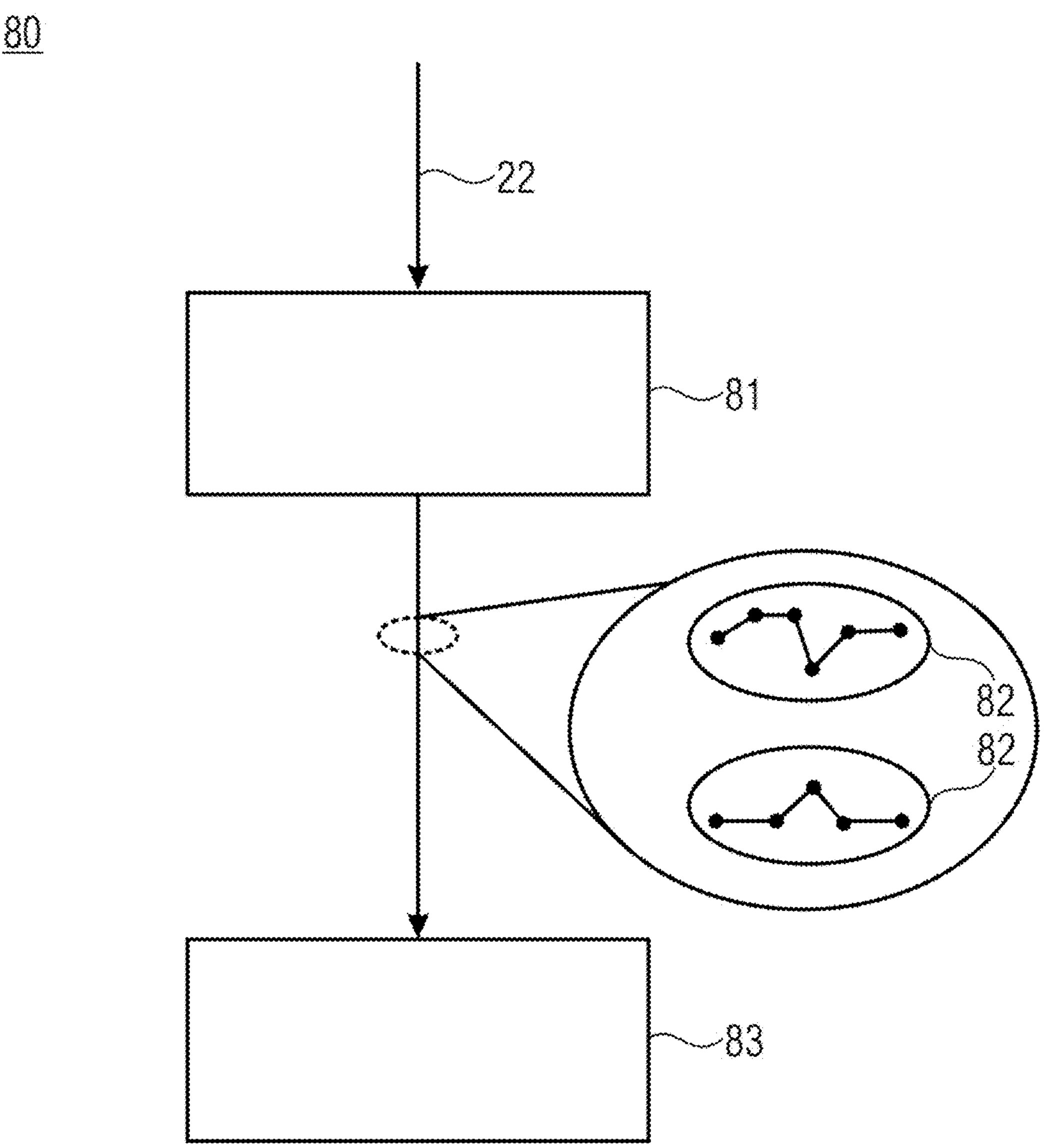
FIG. 8 illustrates a decision path optimization according to an embodiment.

FIG. 8 illustrates a decision path optimization 80 according to an embodiment. Decision path optimization 80 optimizes the decision path with respect to a rate-distortion measure. For example, decision path optimization 80 may be performed by quantizer 30 or in another block of encoder 10.

According to an embodiment, the decision path optimization 80 comprises a block 81 of deriving a plurality of candidate decision paths 82 for the quantization indices for the set of features 22, and a block 83 of estimating, for each of the candidate decision paths 82, a distortion for the rate-distortion measure based on quadratic errors of reconstruction values, which are associated with the quantization indices derived for the features, with respect to the features.

In examples, the decision path optimization 80 may further determine a rate for each of the candidate decision paths, and the decision path optimization 80 may determine a rate-distortion measure for each of the candidate decision paths 82 based on the distortion and the rate determined for the respective candidate decision path 82.

For example, each of the candidate decision paths comprises a selected quantization index value for each of the set of features, of at least a subset of the set of features.

According to an embodiment, the decision path optimization 80 estimates, for each of the candidate decision paths, the distortion measure for the rate-distortion measure based on a polynomial function of a distortion, which distortion represents an error (e.g. a quadratic error, e.g. a sum of respective quadratic errors) of reconstruction values, which are associated with the quantization indices 32 (e.g. the quantization index values of the quantizations indices) derived for the features 22, with respect to the features.

For example, the reconstruction values are the values, onto which the dequantizer 31 of decoder 11 maps the quantization indices in dependence on their quantization index values. In other words, the error, may refer to a deviation of the reconstruction value attributed to a feature 22' by dequantizer 31 from a value of the corresponding feature 22 before quantization 30. To this end, encoder 10 may, exactly or at least in an approximated manner, perform the dequantization 31, i.e. the mapping of the quantization index values selected for the respective candidate decision path, on the reconstruction values associated with the respective quantization index values (thereby considering the candidate decision path in terms of the quantization state 63, on which the mapping depends).

According to an embodiment, encoder 10 derives the reconstructed values by mapping each of the quantization indices derived for the set of features to a reconstructed value associated with the quantization index (e.g., the quantization index value of the quantization index).

In other words, the distortion for the reconstructed data structure 12' may be estimated in features space, i.e. based on the reconstructed features 22', to which the reconstruction values are assigned. Accordingly, encoder 10 does not need to perform the decoding of features 22' to the reconstructed data structure 12' for each of the candidate decision paths. That is, block 83 may use the polynomial function to estimate, based on a distortion of the reconstruction values with respect to their associated features, a distortion of the reconstructed data structure 12' with respect to data structure 12.

For example, the polynomial function may be a function of a distortion, which distortion represents an error of reconstruction values, which are associated with the quantization indices derived for the features, with respect to the features.

According to an embodiment, the polynomial function has a linear term and a quadratic term, e.g., equation (10) below.

For example, coefficients, e.g. for the linear term and the quadratic term, of the polynomial function are predefined.

According to a further embodiment, encoder 10 may determine coefficients, e.g., for the linear term and the quadratic term, of the polynomial function based on the data structure 14. For determining the coefficients, encoder 10 may decode (e.g. using a machine learning predictor, e.g. a neural network, e.g., the decoding network, e.g. the decoding neural network which may be used for deriving the data structure based on the reconstructed values of the features) a plurality of candidate sets of reconstructed values for the features to obtain respective reconstructed data structures. Encoder 10 may estimate respective distortions of the candidate sets of reconstructed values with respect to the data structure (e.g., to obtain a dependency between a distortion of the reconstructed data structure with respect to the data structure and a distortion of a candidate set of reconstructed values with respect to the set of features. E.g., the apparatus may determine, for each of the candidate sets of reconstructed values, a distortion with respect to the set of features 22).

For example, encoder 10 may decode the candidate sets as described with respect to decoding block 21 of decoder 11 of FIG. 1.

In the following, further optional features of the embodiment of FIG. 7 are described, (into which features described with respect to FIG. 8 may optionally be included, also in combination with the following features).

According to an embodiment, each of the features 22 of the set of features is associated with one of one or more arrays (or feature planes), and the encoder 10 is configured for sequentially encoding the features of the one or more arrays according to respective coding order, e.g., raster scan orders, defined within the respective arrays. According to this embodiment, encoder 10 uses respective initial quantization states as the quantization states for the encoding of respective first features of the one or more arrays. Encoder 10 may optimize the decision path with respect to a (e.g. the above-mentioned) rate-distortion measure by determining respective rate-distortion measures for each of the arrays. Encoder 10 determines the rate-distortion measures for the arrays by deriving, for the features of each of the one or more arrays, a respective plurality of candidate decision paths for the quantization indices of the respective array, and estimating, for each of the candidate decision paths (for the quantization indices of the respective array), a distortion measure for the respective rate-distortion measure (e.g., as described with respect to FIG. 8, e.g., based on quadratic errors of reconstruction values, or based on a polynomial function of a distortion which distortion represents an error (e.g. a quadratic error, e.g. a sum of respective quadratic errors) of reconstruction values, which are associated with the quantization indices derived for the features of the respective array, with respect to the features of the respective array).

According to an embodiment, encoder 10 derives the rate-distortion-measures for the respective arrays based on respective rate measures and the respective distortion measures by using, for each of the arrays, a respective scaling factor (e.g. for one of the rate measure and the distortion measure, e.g. a Lagrange parameter, e.g., the scaling factor is predetermined).

For example, the rate measure may be a measure for a data rate of the encoded (e.g. by means of arithmetic encoder 40) quantization indices of the respective candidate decision path.

In the above description, for example, a distortion between two entities, e.g. between a set of reconstructed values and the set of features, or between the data structure and a reconstructed data structure, may be determined based on a metric measuring a distance between the two entities, e.g. by accumulating differences or distances or quadratic errors between pairs of corresponding values of the two entities. E.g., a feature of the set of features and its corresponding reconstructed value may form such a pair, or two corresponding values of the data structure and its reconstruction (e.g., corresponding in terms of position within the data structure).

It is noted that FIGS. 1 to 8 may also serve as an illustration of methods for encoding and decoding a data structure, wherein the blocks represent steps of the respective method. Accordingly, FIG. 1 also illustrates a method for decoding a data structure (e.g., a picture, e.g. a picture of a video) from a data stream, the method comprising sequentially reconstructing a set of features, wherein the method comprises reconstructing a (e.g, current) feature 22', of the set of features by deriving 41 a quantization index 32 from the data stream using arithmetic decoding, mapping 31 the quantization index 32 to a reconstruction value in dependence on a quantization state 63 (e.g. a current value of a quantization state variable) (e.g., the quantization state depends on one or more previously decoded quantization indices, e.g. in terms of a sequential updating based on the one or more previously reconstructed features) (E.g., selecting one out of a plurality of quantizers (e.g. two quantizers) based on a quantization state, which depends on one or more previously decoded quantization indices; and mapping the quantization index to the feature in dependence on the selected quantizer (selected for the quantization index)), and assigning the reconstruction value to the feature 22', updating 61 the quantization state 63 in dependence on the quantization index 32 and the quantization state (e.g. the current quantization state) (e.g., to obtain the quantization state for the reconstruction of a subsequent feature of the set of features (subsequent in terms of a coding order)), and deriving the data structure based on the set of features, wherein the method comprises deriving probabilities (e.g. respective probabilities for a set of quantization indices, out of which set the quantization index is derived) for the arithmetic decoding of the quantization index in dependence on the quantization state.

Similarly, FIG. 2 may also serve as an illustration of a method for encoding a data structure (e.g., a picture, e.g. a picture of a video) into a data stream, comprising deriving 20 a set of features 22 based on the data structure 14, and sequentially encoding the set of features, wherein the method comprises encoding a (e.g., current) feature of the set of features by deriving 30 a quantization index 32 for the feature in dependence on a quantization state (e.g. a current value of a quantization state variable) (E.g., selecting one out of a plurality of quantizers (e.g. two quantizers) based on a quantization state ($s_n$), which depends on one or more previously encoded quantization indices; and mapping the feature to a quantization index in dependence on the selected quantizer), updating 31 the quantization state in dependence on the quantization index and the quantization state) (e.g. the current quantization state) (e.g., to obtain the quantization state for the encoding of a subsequent feature of the set of features (subsequent in terms of a coding order)), and encoding 40 the quantization index into the data stream using arithmetic coding, wherein the method comprises deriving probabilities (e.g. respective probabilities for a set of quantization index values, out of which set one value is selected for the quantization index) for the arithmetic coding of the quantization index in dependence on the quantization state.

In the following, further embodiments of the invention are described. The embodiments described in the following may optionally be examples of the previously described embodiments, and features, details, functions, and advantages of the embodiments described below may optionally be combined with the embodiments described above.

In particular, it is noted, that the specific implementation of the encoding and decoding networks (Enc and Dec) described in sections 1.2. and 1.3 below are merely illustrative, and that different architectures/implementations are possible. This applies in particular for the number of layers/channels/kernels of the encoding and decoding neural networks. Same applies to the hyper encoder and hyper decoder.

Variational auto-encoders for image compression are usually optimized with respect to a specific target bitrate. This approach is known to yield strong compression results when uniform scalar quantization is used, but the distribution of the quantized features may not be captured well by the entropy model when the step size is changed too severely. Hence, combining two scalar quantizers with different reconstruction levels requires to adapt the training stage f or the VAE to benefit from this. Thus, the following subsections will cover the network architecture and the employed training algorithm FIG. 9 illustrates a flow chart of the encoding and decoding step, e.g. encoding block 20 and decoding block 21, according to an embodiment.

Figure 9:
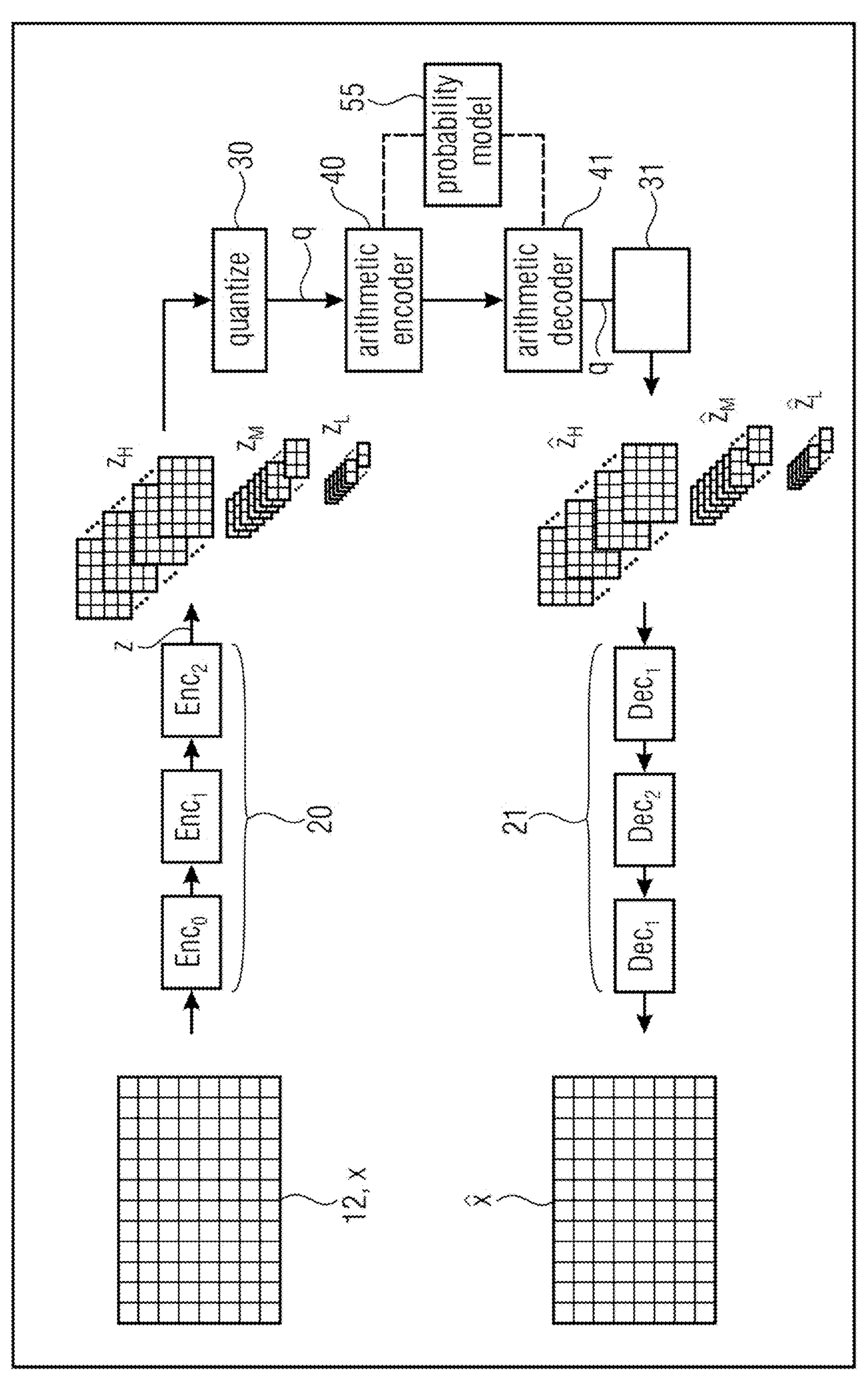
FIG. 9 illustrates a flow chart for encoding and decoding an image according to an embodiment.

For example, the VAEs in this paper may have the same architecture as the one presented in and depicted in FIG. 9. The image coding process is described regardless of the quantization of the features. The implementation details of TCQ are explained below.

Given an input image $x \in \mathbb{R}^{H \times W \times 1}$, e.g. data structure 12, a deep-learned convolutional network Enc encodes it into a set of real-valued features as $$Enc(x) = z \in \mathbb{R}^{w \times h \times c_0} \oplus \mathbb{R}^{\frac{w}{2} \times \frac{h}{2} \times c_1} \oplus \mathbb{R}^{\frac{w}{4} \times \frac{h}{4} \times c_2} \tag{1}$$

As illustrated in FIG. 9, network Enc may comprise three portions, e.g., layers, $Enc_0$, $Enc_1$, and $Enc_2$. $Enc_0$ may receive the original image x, e.g. as a single input channel. For example, the number of output channels of $Enc_0$, which are input to $Enc_1$ is 256, and the number of output channels of $Enc_1$, which are input to $Enc_2$, is 256. $Enc_2$ may provide features z in 256 output channels, each output channel providing one of feature arrays, in which the features z may be arranged. Each of $Enc_0$, $Enc_1$ and $Enc_2$ may have a down-sampling rate of 2. $Enc_0$ and $Enc_1$ may use a generalized divisive normalization (GDN) activation, while $Enc_2$ may apply no activation. Encoding network Enc provides features z, e.g. arranged in feature arrays $z_H$, $z_M$, $z_L$, e.g. as illustrated in FIG. 9 and e.g., in accordance with equation (1), e.g., with $z_H \in \mathbb{R}^{w \times h \times c_0}$, $$z_M \in \mathbb{R}^{\frac{w}{2} \times \frac{h}{2} \times c_1},\ z_L \in \mathbb{R}^{\frac{w}{4} \times \frac{h}{4} \times c_2}.$$

The features are quantized to obtain quantized indices $\hat{z}$.

Next, let $$\{n\}_{n=1}^{N}$$

denote the flattened indices within the representation (1). For quantization, we associate a quantization index $q_n \in \mathbb{Z}$ with each feature value $z_n \in \mathbb{R}$. The decoder then maps the quantization indexes to the reconstructed features $\hat{z}$. As explained below, the latter mapping may depend on the transmitted parameters of a probability model 55. Subsequently, the decoder network Dec reconstructs the image as $$\hat{x} = Dec(\hat{z}) \tag{2}$$

As illustrated in FIG. 9, network Dec may comprise three portions, e.g., layers, $Dec_1$, $Dec_2$, and $Dec_3$. $Dec_3$ may receive the reconstructed features $\hat{z}$, e.g. in 256 input channels. For example, the number of output channels of $Dec_3$, which are input to $Dec_2$ is 256, and the number of output channels of $Dec_2$, which are input to $Dec_1$, is 256. $Dec_3$ may provide, in a single output channel, the reconstructed image $\hat{x}$. Each of $Dec_1$, $Dec_2$, and $Dec_3$ may have an up-sampling rate of 2. $Dec_3$ and $Dec_2$ may use a generalized divisive normalization (GDN) activation, while $Dec_1$ may apply no activation.

For inferring the probability distribution of the features, the hyper encoder extracts side information y from the features as shown in FIG. 10, which is described later. Given the transmitted side information, the feature entries are assumed to be normally distributed $z \sim \mathcal{N}(\mu, \sigma^2))$ and stochastically independent.

Hence, the side information is parsed before the features such that the hyper decoder determines the estimates $(\hat{\mu}, \hat{\sigma})$. Moreover, based on the decoded side information $\hat{\mu}$, the mapping $q_n \mapsto \hat{z}_n(q_n, \hat{\mu}_n)$ is specified. For the scalar case and step size $\Delta > 0$, the mapping is given by $\hat{z}_n = \Delta q_n + \hat{\mu}_n$ and for TCQ it is given below.

The probabilities are obtained by integrating the density over the quantization intervals which yields $$\mathbb{P}(\hat{z}_n) \approx P_z(\hat{z}_n; (\hat{\mu}_n, \hat{\sigma}_n^2)) = \int_a^b \mathcal{N}(t, (\hat{\mu}_n, \hat{\sigma}_n^2))dt. \tag{3}$$

Here, the lower and upper boundaries are given by $$a = (\hat{z}_n(q_n - 1, \hat{\mu}_n) + \hat{z}_n(q_n, \hat{\mu}_n))/2,\ b = (\hat{z}_n(q_n, \hat{\mu}_n) + \hat{z}_n(q_n + 1, \hat{\mu}_n))/2.$$

For transmitting the side information, a probability model $P_y(\bullet, \phi)$ with parameters $\phi$ is optimized.

The networks (1) and (2) consist of multi-scale convolutional layers [17, 18] with GDN activations [10]. The subscripts refer to the differently scaled components. The parameters $(\hat{\mu}, \hat{\sigma})$ are to be estimated.

FIG. 10 illustrates a flow chart of a hyper system 88 according to an embodiment. The hyper system 88 derives the parametrization $(\hat{\mu}, \hat{\sigma})$ for the probability model 55 based on the features z. The hyper system 88 comprises, on encoder side, a hyper encoder 90, which derives hyper priors y based on the features z, y=Enc'(z).

For example, the hyper encoder 90 comprises three portions, e.g., layers, $Enc'_0$, $Enc'_1$, and $Enc'_2$. $Enc'_0$ may receive the features z, e.g. in 256 channels. For example, the number of output channels of $Enc'_0$, which are input to $Enc'_1$ is 256, and the number of output channels of $Enc'_1$, which are input to $Enc'_2$, is 256. $Enc'_2$ may provide features z in 256 output channels, each output channel providing one of arrays, in which the hyper priors y may be arranged. $Enc'_0$ may have a downsampling rate of 1, and each of $Enc'_1$ and $Enc'_2$ may have a down-sampling rate of 2. $Enc_0$ and $Enc_1$ may use a ReLU activation, while $Enc_2$ may apply no activation. E.g., hyper encoder 90 may provide the hyper priors y arranged in arrays $y_H$, $y_M$, $y_L$, e.g. as illustrated in FIG. 10. The hyper priors z may be quantized by quantizer 93, e.g. using the operation $$\left\lfloor y+\frac{1}{2}\right\rfloor,$$

to derive quantized hyper priors 99. An arithmetic encoder 95 may be used to encode the quantized hyper priors 99. The encoded hyper priors may be transmitted as side information 72 in the data stream 14.

On decoder side, the hyper system 88 may comprise an arithmetic decoder 97, which decodes the quantized hyper priors 99 from the side information 72 of data stream 14. The arithmetic encoder 95 and the arithmetic decoder 97 may apply a probability model $P_y$, reference sign 95 in FIG. 10, for the arithmetic coding. On decoder side, the decoded quantized hyper priors may optionally be subjected to a dequantization 98 which maps the quantized hyper priors 99 to reconstructed hyper priors $\hat{y}$, as shown in FIG. 10. However, dequantization is optional, e.g., in examples in which the quantization 93 represents a rounding operation, e.g. as the example of the quantizer 93 mentioned above, dequantization might not be necessary. In such a case the reconstructed hyper priors $\hat{y}$ may correspond to the quantized hyper priors 99. The reconstructed hyper priors $\hat{y}$ are the input to a hyper decoder Dec', reference sign 91 in FIG. 10, which determines the parametrization $(\hat{\mu},\hat{\sigma})$ based on the decoded quantized hyper priors $\hat{y}$.

As illustrated in FIG. 10, the hyper decoder Dec' may comprise three portions, e.g., layers, $Dec'_1$, $Dec'_2$, and $Dec'_3$. $Dec'_3$ may receive the reconstructed hyper priors $\hat{y}$, e.g. in 256 input channels. For example, the number of output channels of $Dec_3$, which are input to $Dec_2$ is 256, and the number of output channels of $Dec_2$, which are input to $Dec_1$, is 384. $Dec_3$ may provide, e.g. in 512 output channels, the parametrization $(\hat{\mu},\hat{\sigma})$ for the arithmetic coding of features z, e.g. one parametrization for each feature. $Dec_1$ and $Dec_2$ may have an upsampling rate of 2, and $Dec_3$ may have an up-sampling rate of 1. $Dec_3$ and $Dec_2$ may use a ReLU activation, while $Dec_1$ may apply no activation.

In the following, training details for scalar quantization are described.

Let $\tilde{z}(\Delta):=z+\Delta\varepsilon$ and $\tilde{y}:=y+\varepsilon$ denote distorted versions of the features and side information with uniform noise $$\varepsilon\sim\mathcal{U}\left(-\frac{1}{2},\frac{1}{2}\right).$$

The bitrate is then modeled as the cross entropy of the noisy variables $$R\approx-\left(\sum\nolimits_n\log_2 P_z(\tilde{z}_n;(\hat{\mu}_n,\hat{\sigma}_n))+\sum\nolimits_m\log_2 P_y(\tilde{y}_m)\right). \tag{4}$$

The rate term (4) yields a differentiable estimation of the RD cost as $$\mathbb{E}\left[\sum\nolimits_{i=1}^{2}\kappa_i\left(MSE(x,Dec(\tilde{z}(\Delta_i)))+\lambda_i\frac{R}{HW}\right)\right]. \tag{5}$$

As proposed in [9], we use pairs of Lagrange parameters $(\lambda_1,\lambda_2)$ with adequate weights $(\kappa_1,\kappa_2)$ and aim at minimizing the training loss (5). We have optimized five different networks with Lagrange parameters. Additionally, we have fixed $(\kappa_1,\kappa_2):=(0.75,0.25)$. For the optimization, we have run stochastic gradient descent using the Adam optimizer [15] and common settings described in [9].

Note that the parameters $\lambda_1$ and $\lambda_2$ are chosen such that the associated target bitrates are relatively close. Hence, the networks are optimized with respect to overlapping bitrate ranges. Furthermore, our experiments suggest that using (5) for optimization yields the same (for low bitrates even better) compression efficiency as optimizing with respect to a single Lagrange parameter. Finally, minimizing (5) with respect to pairs of small parameters yields VAEs whose un-quantized features are closer to recovering the original input image. Thus, decreasing the quantization error of the features is expected to reduce the sample distortion more reliably for higher target bitrates.

Trellis-Coded Quantization

TCQ was first described in [18]. In this work we use the same specific TCQ design that was adopted into VVC [24]. On the decoder side, the design consists of two scalar quantizers and a mechanism that selects one of these two quantizers. The design of the quantizers will be detailed in the following.

Figures 11A, 11B:
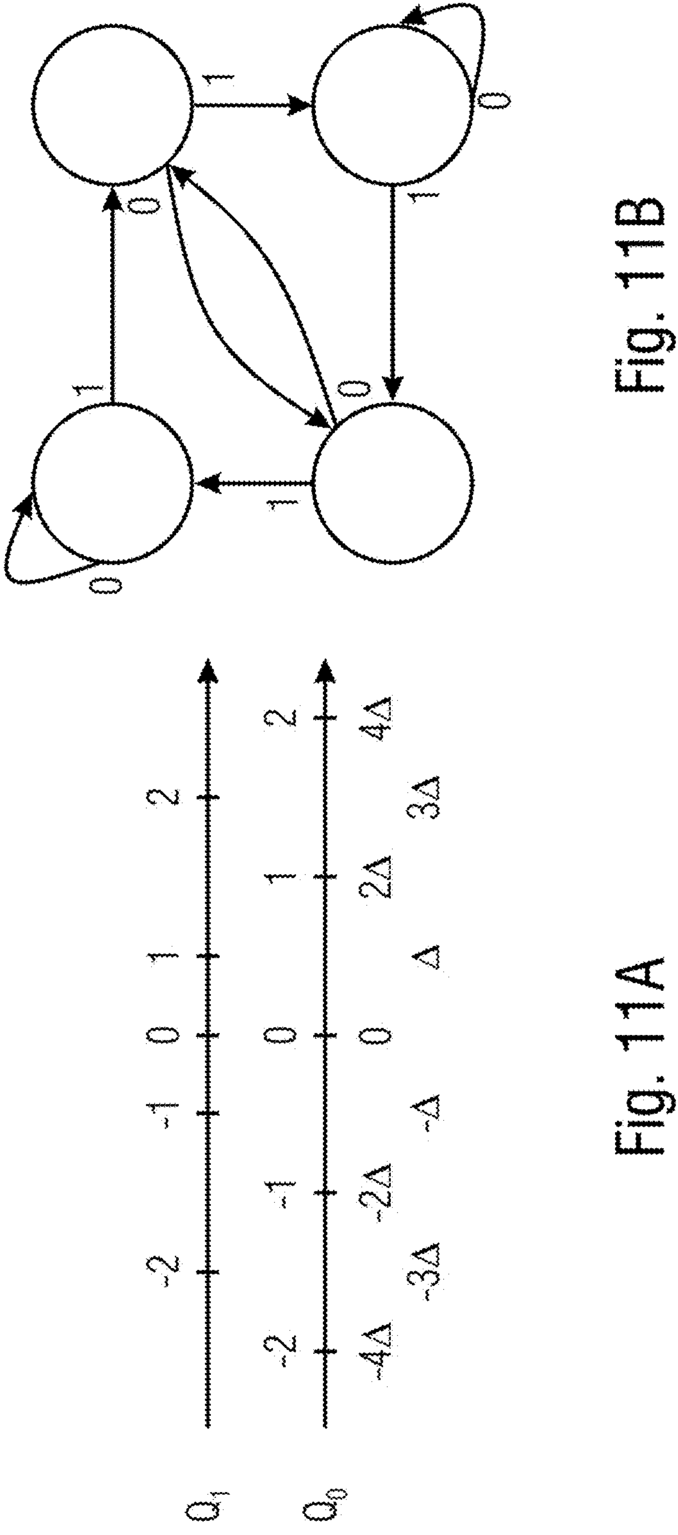
FIG. 11A illustrates two quantizers according to an embodiment.
FIG. 11B illustrates a state machine according to an embodiment, FIG. 12A, B illustrate a rate-distortion graph for an embodiment.

FIG. 11A illustrates a design of quantization intervals of quantizers $Q_0$ and $Q_1$ according to an embodiment. The first quantizer $Q_0$ contains the even multiples of the quantization step size, while the second quantizer $Q_1$ contains the odd multiples of, as shown in FIG. 11A. For example, the value 0 is included in both quantizers for improved low rate performance.

For switching between the quantizers, a state machine with four states $S_0 \ldots S_3$ is used as shown in FIG. 11B. FIG. 11B illustrates a state machine with four states for switching between quantizers $Q_0$ and $Q_1$ according to an embodiment. For example, the state machine starts in state $S_0$ and transitions into the next state after reconstruction of each feature $\hat{z}$n. Quantizer $Q_0$ is selected whenever the state machine is in state $S_0$ or $S_2$ while $Q_1$ is selected for states $S_1$ or $S_3$. For each quantization index $q_n$, the reconstructed value $\hat{z}_n$ is calculated by $$\hat{z}_n=(2q_n-(k\,\&\,1)\cdot\operatorname{sgn}(q_n))\cdot\Delta+g_n, \tag{6}$$

with k being the index of the current state $S_k$. Here, the parameter $g_n$ can be zero. If it is not zero, it does not depend on $q_n$. For example, if, as in the example described with respect to FIG. 9, one models $z_n\sim\mathcal{N}(\mu_n,$ $$\sigma_n^2),$$

then the offset is set to the estimate of $\mu_n$, i.e. $g_n=\hat{\mu}_n$. Then the state machine transitions into the next state by following the edge determined by the parity of $q_n$.

At the encoder, switching between the quantizers $Q_0$ and $Q_1$ creates dependencies: For each feature $\hat{z}_n$, the different state transitions need to be evaluated depending on the previous decision. Starting from $\hat{z}_0$, the possible paths can be written down as a trellis with four states. The Viterbi algorithm [25] is then used to find the path with the minimum cost through the trellis. Note that due to the dependency on the previous state, the same coding order has to be used at encoder and decoder. Furthermore, the algorithm is only used in the actual encoding process and not during the training stage. For evaluating the cost for each decision in the Viterbi algorithm, a generic rate-distortion criterion is used:

$$C = D + \lambda R. \tag{7}$$

Embodiments of this invention use TCQ for quantizing the features generated by a VAE. Experiments suggest that the RD performance of the investigated VAEs with TCQ is superior to using uniform scalar quantization. Moreover, we adapt the training by modeling each scalar quantizer of TCQ by a distinct noisy version of the features. We then employ a hard decision between these representations per entry. We have observed that our training modification further improves the bitrate savings achieved by TCQ.

The main aspect for implementing a decoder is that the probability mass functions for arithmetic decoding the quantization indexes are derived based on probability parameters (which are derived based on previously decoded data from the bitstream) and a quantization state, where the quantization state is updated after decoding a quantization index.

Coding of Quantization Indexes

According to embodiments of the present invention, the pmf for the next quantization index $q_n$ to be encoded or decoded is derived based on a probability density model f, parameterized using one or more parameters $a_n$, which are derived using already encoded or decoded data, and additionally a quantization state $s_n$. In an advantageous embodiment, the density model f represents a Gaussian pdf and the parameters $a_n$ are the mean $\mu_n$ and the variance $$\sigma_n^2.$$

In another advantageous embodiment, the density model f is a Laplacian pdf and the parameters $a_n$ are the mean $\mu_n$ and the scale parameter $\sigma_n$. In principle, any parameterized density model f can be used.

The parameters $a_n$, which can be interpreted as describing the distribution (using the model f) of the unquantized variables $z_n$, can be derived using already encoded or decoded data. In an advantageous embodiment, the parameters $a_n$ are derived based on transmitted hyper parameters. Given these hyper parameters, the pdf parameters $a_n$ for all quantization indexes $q_n$ are derived by applying a given neural network (with a specific structure and specific network weights). In another advantageous embodiment, the pdf parameters $a_n$ for all quantization indexes $q_n$ are derived based on hyper parameters and, in addition, already decoded quantization indexes $q_n$ (or, alternatively, decoded sample values $z_n=z(q_n,s_n,a_n)$) in a causal spatial neighborhood of the current quantization index $q_n$ to be decoded. Also, in this setting, the pdf parameters $a_n$ could be derived using a neural network, where the input to the neural network are the hyper parameters and the decoded quantization indexes or the decoded samples in the causal neighborhood of the current quantization indexes. In another embodiment, no hyper parameters are transmitted and the pdf parameters $a_n$ are derived based on already decoded quantization indexes $q_n$ (or, alternatively, decoded sample values $z_n=z(q_n,s_n,a_n)$) in a causal spatial neighborhood of the current quantization index $q_n$ to be decoded. The derivation can be done using a neural network. In a low-complexity setting, the neural network can simply represent a scalar product of the vector of neighboring quantization indexes (or decoded samples) and a fixed weighting vector.

Then, given the quantization state $s_n$, the density model f and the associated parameters $a_n$ (which have been derived in one or another way and are unique for a certain quantization index), the pmf $p_n$ for all possible values k for a current quantization index $q_n$ is derived by integrating the density model f with parameters $a_n$ according to:

$$p_n(k|a_n, s_n) = \int_{L(k,s_n,a_n)}^{U(k,s_n,a_n)} f(t; a_n)dt, \tag{8}$$

where the integration boundaries L and U depend on the considered value k of the quantization index and the quantization state $s_n$ for the current index. With $z(q_n,s_n,a_n)$ denoting the mapping from quantization indexes $q_n$ to reconstructed samples (or, more accurately, latent variables), in an advantageous embodiment of the invention, the integration boundaries are derived according to:

$$L(k, s_n, a_n) = \frac{z(k-1, s_n, a_n) + z(k, s_n, a_n)}{2}$$

$$U(k, s_n, a_n) = \frac{z(k, s_n, a_n) + z(k+1, s_n, a_n)}{2}.$$

Note that, according to embodiments of the present invention, the integration boundaries do not only depend on the density model f with the associated parameters $a_n$, but also on the current quantization state $s_n$. The actually used derivation for L and U could be modified. One possibility would be to shift the L and U values away from the mean of the pdf model by an offset $\alpha\Delta$ that depends on the quantization step size $\Delta$.

Table 1 shows an example for a TCQ state machine with 4 states

| current | quantizer | next state $s_{n+1}$, for | |
|---|---|---|---|
| state $s_n$ | used for $z_n$ | $(q_n\&1) = 0$ | $(q_n\&1) = 1$ |
| 0 | $Q_0$ | 0 | 1 |
| 1 | $Q_1$ | 2 | 3 |
| 2 | $Q_0$ | 1 | 0 |
| 3 | $Q_1$ | 3 | 2 |

The actual reconstruction mapping $z(q_n,s_n,a_n)$ depends on the TCQ state transition table used. For the state transition table defined in Table 1 and the quantizer definition above, it is given by:

$$z(q_n, s_n, a_n) = \Delta \cdot (2 \cdot q_n - (s_n \,\&\, 1) \cdot \mathrm{sgn}(q_k)) + g(a_n),$$

where $\Delta$ denotes the quantization step size. Both the number of quantization states and the actual state transition could be modified, so that the actual reconstruction formula $z(q_n,s_n, a_n)$ would be modified accordingly. The offset $g(a_n)$ could be any function of the probability parameters $a_n$; in an advantageous embodiment, it represents the mean of the pdf model, so that a quantization index $q_n=0$ results in a reconstructed value that is equal to the mean of the pdf model.

In an advantageous embodiment of the invention, the probability masses are calculated separately for each of the two used quantizers $Q_0$ and $Q_1$. Since the steps are different for each quantizer, the integration intervals are different. Especially for $Q_1$ the integration intervals do not have equal size. They are much smaller around $g(a_n)$. For the advantageous embodiment, with $\mu_n=g(a_n)$ representing the mean of the pdf model, the following integration boundaries are obtained, where the interval that includes the mean denotes the interval [L; U] for k=0:

$$Q_0:$$

$$[L;U] = \ldots, [\mu_n - 5\Delta; \mu_n - 3\Delta], [\mu_n - 3\Delta; \mu_n - \Delta], [\mu_n - \Delta; \mu_n + \Delta], [\mu_n + \Delta; \mu_n + 3\Delta], [\mu_n + 3\Delta; \mu_n + 5\Delta], \ldots$$

$$Q_1:$$

$$[L;U] = \ldots, [\mu_n - 4\Delta; \mu_n - 2\Delta], [\mu_n - 2\Delta; \mu_n - 0.5\Delta], [\mu_n - 0.5\Delta; \mu_n + 0.5\Delta], [\mu_n + 0.5\Delta; \mu_n + 2\Delta], [\mu_n + 2\Delta; \mu_n + 4\Delta], \ldots$$

In one embodiment of the invention, the determined pmf for a current quantization index $q_n$ is used for arithmetic encoding and decoding of the current quantization index. In another embodiment, the multi-symbol arithmetic coder is replaced by a binary arithmetic coder. Then, a certain binarization (prefix-free code) is employed for mapping the quantization indexes into a sequence of bins, and the bins are coded using a binary arithmetic coder. In such a setting, a binary pmf is used for arithmetically coding each single bin of the bin sequence that represents a quantization index. The binary pmf for each bin is derived based on the pmf for the quantization indexes; the derivation depends on the binarization used.

Alternatively, the parameters $p_n$ for the binary pmfs $\{1-p_n,p_n\}$ for the individual bins could be directly derived based on the quantization state $s_n$ and the hyper parameters and/or the already coded/decoded quantization indexes or reconstructed values in a causal neighborhood of the current quantization index $q_n$. As an example, multiple neural networks could be defined. And then, depending on the quantization state $s_n$ and the bin index (i.e., the index inside the bin sequence for a quantization index), one of the multiple neural networks is selected and the probability parameter $p_n$ for the binary pmf is determined by applying the selected neural network with the hyper parameters and/or the already coded/decoded quantization indexes or reconstructed values in a causal neighborhood as inputs. The corresponding bin is then arithmetically encoded or decoded using the corresponding binary pmf.

After encoding or decoding a quantization index $q_n$, the quantization state $s_n$ is updated depending on the parity of the current decoded quantization index $q_n$:

$$s_{n+1} = stateTransTable[s_n][q_n \ \& \ 1],$$

where "stateTransTable" specifies the chosen state transition table. The updated quantization state $s_{n+1}$ is then used for deriving the probability masses for the next quantization index $q_{n+1}$.

Encoder Operation

In the rate-distortion criterium $$C = D + \lambda R, \tag{9}$$

R is the number of bits used by the arithmetic coder which can be reliably estimated by the probability masses used in arithmetic coding. With $q_n$ being the value of a quantization index, and $p_n(q)$ denoting the probability mass function (pmf) for the possible quantization indexes at scan index n, the rate for the quantization index $q_n$ is equal to $R_n(q_n)=-\log_2 p_n(q_n)$.

At the encoder the number of required bits can be directly determined from the probability mass functions (multi-symbol or binary). This allows to directly use the exact number of bits for the rate term R in equation 9 for evaluating the cost criteria in each step of the Viterbi algorithm.

The distortion D can be determined in either the feature domain, or in the sample domain after decoding.

In embodiments of the invention the following options may be used for the distortion D:

- In the feature domain, quadratic error of the feature to be quantized is used.
- Alternatively, a fitted polynomial function is used to estimate the distortion in the sample domain from the distortion in the feature domain.

Determining the distortion in the sample domain is not feasible since the decoder can only reliably reconstruct complete images. This requires a large amount of computational resources which is too complex to run multiple times for each step of the quantization process. The decoder also requires all features to decode the whole image, which would require combining quantized and not yet quantized features during the decision process.

Embodiments of this invention allow estimating the distortion in the sample domain by using a fitted polynomial function. Fitting is achieved by running a separate process, in which the decoder is run on variations of the coefficients. The variations are chosen randomly in the approximate range of the expected quantization error. After each decoder run, the distortion is measured in the sample domain. The polynomial function coefficients are chosen to resemble a relationship between the distortion in feature space and sample space as closely as possible.

- In one embodiment of the invention, the estimation process is run on a training set of images before encoding.
- In an alternative embodiment of the invention, the estimation process is run as part of the encoding process on the actual image to be encoded.

In a specific embodiment of the invention the polynomial functions is:

$$D = c_{p,0} * d^2 + c_{p,1} * d \tag{10}$$

where d is the distortion in feature space and $c_{p,n}$ are the pre-determined coefficients depending on the feature plane p.

The Lagrange multiplier $\lambda$ may be scaled appropriately because feature and sample distortion typically lie in different ranges.

In one implementation, a raster scan order as the coding order for TCQ is used, with an independent trellis for each feature channel.

Training Details for Trellis-Coded Quantization

Above, training details for scalar quantization were described. Compared to the above description, for trellis coded quantization, the scalar quantization is replaced by adding uniform noise during the training stage. However, we found that a different noisy representation of the features is beneficial for implementing certain aspects of TCQ into the training, Here, we define variables $\bar{z}^0:=z+2\Delta\ \varepsilon$ and $\bar{z}^1:=\bar{z}^0-\text{sgn}(\bar{z}^0)\Delta$ with noise $\varepsilon$ as before. Since executing the Viterbi algorithm within the optimization of (5) is computationally heavy, we use a simpler criterion for choosing between these noisy variables. In particular, we pick for each index the perturbed entry which is closer to the original value, i.e.

$$\bar{z}_n := \arg\min_{t\in\{\bar{z}_n^0,\bar{z}_n^1\}} |z_n - t|. \tag{11}$$

For optimizing the networks with respect to TCQ, we replace $\tilde{z}$ by $\bar{z}$ in the rate term (4) and the training cost (5). The feature probabilities are computed as stated in (8) where the integration limits are determined by the selected quantizer, i.e the choice between $$\bar{z}_n^0$$

and $$\bar{z}_n^1$$

per entry. Thereby, we regard the special case of the zero which appears in both scalar quantizers (6) but with different quantization intervals. Finally, note that we have optimized a distinct set of VAEs for TCQ using the same Lagrange parameters and weights. Thus, we are able to compare the impact of using (11) and the modified probability computation over simply adding uniform noise.

Decoder Operation According to an Embodiment

Embodiments of this invention provide a device that

1. Receives a bitstream of coded values (e.g. quantized features of a VAE network), coded hyper-parameters and a quantization step size $\Delta$.
2. Decodes the hyper-parameters into parameters $a_n$ of a probability density model f. A specific embodiment of the invention uses a Gauss distribution with parameters $a_n=(\mu_n,$ $$\sigma_n^2).$$

Different parameters can be provided for different groups of coded values (e.g. one for each feature plane, or one for each feature to be decoded)

3. Contains a state machine and two (or more) scalar quantizers (e.g. $Q_0$ and $Q_1$) using the provided quantization step size. The state of the state machine is used to select one of the two quantization functions. An example implementation of the state machine is shown in FIG. 11B, example quantization functions are shown in FIG. 11A.
4. Decodes one or multiple 2d arrays of quantization indexes and reconstructs them into one or multiple arrays of reconstructed values (latent variables). The quantization indexes are decoded and reconstructed in a predefined coding order (e.g., one array after another with a raster-scan inside an array). The initial quantization state $s_0$ (for each array or all arrays) is set to a predefined values (e.g., equal to zero). Then, the values are reconstructed in a predefined order, where the following applies for each reconstructed value $z_n$:
   (a) Based on the current quantization state $s_n$ and the parameters $a_n$ for the current quantization index $q_n$, the pmf for the possible values k for the current quantization index $q_n$ is derived according to:

$$p_n(k|a_n, s_n) = \int_{L(k,s_n,a_n)}^{U(k,s_n a_n)} f(t; a_n)dt$$

with $$L(k, s_n, a_n) = \frac{z(k-1, s_n, a_n) + z(k, s_n, a_n)}{2},$$

$$U(k, s_n, a_n) = \frac{z(k, s_n, a_n) + z(k+1, s_n, a_n)}{2},$$

where $z(q_n,s_n,a_n)$ denotes the mapping from quantization indexes $q_n$ to reconstructed values given the probability parameters $a_n$.
   (b) The derived pmf $p_n$ is used for arithmetically decoding the current quantization index $q_n$.
   (c) Based on the decoded quantization index $q_n$ and the quantization state $s_n$, the decoded value is reconstructed according to:

$$z_n = z(q_n, s_n, a_n).$$

(d) The quantization state $s_{n+1}$ for the next quantization index is derived based on the current quantization state $s_n$ and the parity of the current quantization index $q_n$ using a defined state transition table:

$$s_{n+1} = stateTransTable[s_n][q_n \,\&\, 1],$$

5. After decoding all quantization indexes $q_n$ and reconstructing all values for the one or more 2d arrays of latent variables, the reconstructed image is obtained by applying a neural network with the reconstructed 2d arrays as inputs.

As described above, several modifications of the advantageous embodiment are possible:

Transmitting hyper-priors is not required. The probability density model f can alternatively be parameterized by pre-defined values or by values transmitted in other ways.

The derivation of the probability parameters $a_n$ can additionally or exclusively depend on already decoded quantization indexes $q_n$ or already reconstructed values $z_n$ in a causal neighborhood.

The derivation of the lower and upper integration bounds L and U, respectively, can be modified by shifting them from the middle between two possible reconstruction values by an offset $\alpha\Delta$ away from the mean of the pdf model. The factor $\alpha$ can be a fixed value or it can depend on the considered index k and/or the quantization state $s_n$.

The quantization indexes $q_n$ can be decoded using a binary arithmetic decoder. Then, bins of a binarization for the quantization index are decoded from the bitstream and are eventually mapped to the quantization index. For this binarization, any prefix-free code can be used. The pmf for the bins used in arithmetic decoding are then derived given the binarization and the pmf for the quantization indexes.

When using binary arithmetic coding, the parameter $p_n$ for the binary pmf $\{1-p_n, p_n\}$ can be directly derived depending on the bin index, the quantization state, and the hyper parameters and/or decoded quantization indexes $q_n$ (or reconstructed values $z_n$) in a causal neighborhood of the current quantization indexes. In a particular embodiment, multiple neural networks or defined, and depending on the quantization state $s_n$ and the bin index, one of the multiple networks is selected. Using the selected network, the parameter $p_n$ is derived using the hyper parameters and/or decoded quantization indexes $q_n$ (or reconstructed values $z_n$) in a causal neighborhood of the current quantization indexes as inputs.

Performance of an Exemplary Embodiment

In the following, the performance of an embodiment, which may be an exemplary implementation of the previously described embodiments is described. The embodiment uses an auto encoder (a machine learning predictor of encoding and decoding the features, see examples of encoding block 20 and decoding block 21).

The training for all networks of the exemplary implementation was conducted using luma-only crop from the ImageNet [28] database. Coding experiments were performed using luma-only full images of the Kodak image database [29]. Encoder and decoder were run on 5 operation points to generate RD curves. Two BD-rate values [30] were calculated: one for the lower four and another for the higher four operation points. Although there is an overlap, results can be quite different since the largest gains are obtained for lower bitrates.

Reference and Coding Conditions

The reference for all tests is the variable-rate auto-encoder from [17]. It uses a single network for all rate points and a scalar quantizer for all rate points, varying the quantization step size $\Delta \in [1.0, 5.0625]$. For the test runs with TCQ enabled, it was tried to align the operation points by adapting the quantization step size. In most cases, a correction factor of 0.55 was suitable to approximately match the base with scalar quantization.

Auto-Encoder with a Single Network

The first investigations were performed on the reference auto-encoder network mentioned in in the previous section. From previous research it is known that this model behaves well when changing quantization steps and modifying quantized feature values. However, we did not re-train the network using the considerations laid out with respect to Trellis-Coded-Quantization above.

Figures 12A, 12B:
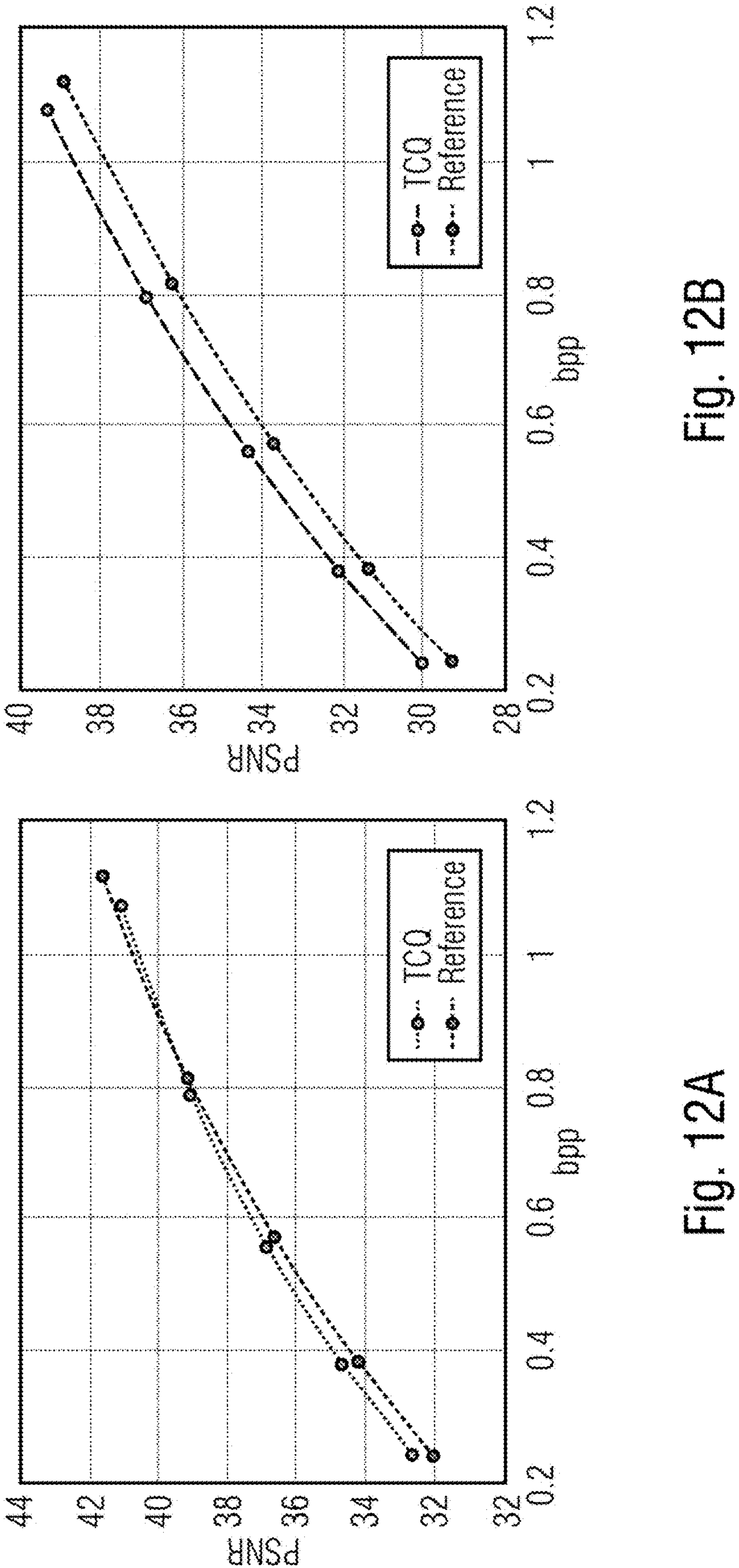

FIG. 12 illustrates a rate-distortion graph for picture kodimg16 using TCQ. For TCQ compared to the scalar quantization reference, an average BD-rate gain of 4.83% was obtained for low bitrates (see Base in Table 2) with a minimum of 2.83% in kodimg06 and a maximum of 6.72% in kodimg13. For high bitrates the overall gain is 2.07% as performance improvements get lower with increasing bitrate. However, at the operation point with the highest bitrate we observed bitrate losses in most images. An example PSNR curve is shown in FIG. 4A. Since vector quantization should outperform scalar quantization, we checked the quantization performance in the feature domain, before applying the decoder network. A feature PSNR was calculated directly between the unquantized and the quantized features. An example is shown in FIG. 12B. In feature domain a BD-rate gain of 11.00% is reported in low bitrate. In high bitrate a gain of 9.41% is achieved, which is a bit smaller, but still significant. This leads to the conclusion that TCQ works well within the feature domain, where the cost function (7) is calculated.

Auto-Encoder with Different Networks Per Operation Point

In addition to using a single encoder model that is optimized for all target operation points, we also trained separate models for each operation point and for different quantizers, as described above, see Training details for scalar quantization. Table 2 lists BD-rate coding results for applying each of the models trained for a pair of Lagrange parameter (λ1, λ2) to all operating points averaged over the complete Kodak image set.

TABLE 2

| | | (a) Scalar quantization | | (b) TCQ | | (c) TCQ with adapted training | |
|---|---|---|---|---|---|---|---|
| Name | Description | high-bitrate | low-bitrate | high-bitrate | low-bitrate | high-bitrate | low-bitrate |
| Base | Baseline VAE from [17] | 0.00% | 0.00% | −2.07% | −4.83% | — | — |
| Test 1 | VAE optimized with $(\lambda_1, \lambda_2)$ = (64, 128) | 1.75% | 2.63% | −3.26% | −4.73% | −3.65% | −4.45% |
| Test 2 | —"— $(\lambda_1, \lambda_2)$ = (128, 256) | −1.02% | −1.46% | −2.77% | −5.85% | −3.97% | −5.74% |
| Test 3 | —"— $(\lambda_1, \lambda_2)$ = (256, 512) | 0.16% | −3.54% | 1.45% | −4.83% | −4.40% | −7.69% |
| Test 4 | —"— $(\lambda_1, \lambda_2)$ = (512, 1024) | 5.53% | −2.52% | 9.32% | −1.13% | −3.17% | −8.25% |
| Test 5 | —"— $(\lambda_1, \lambda_2)$ = (1024, 2048) | 16.69% | 1.15% | 23.18% | 5.03% | 1.43% | −6.84% |
| Overall best | Combine tests 1-5 | −2.45% | −5.47% | −4.31% (−2.23%)* | −6.53% (−1.81%)* | −5.02% (−2.27%)* | −8.61% (−2.43%)* |

Table 2 illustrates results for uniform-scalar quantization and TCQ combined with differently optimized VAEs. The columns (a) show the BD-rate compared to "Base" when using a scalar quantizer. In columns (b), the scalar quantizer is replaced with TCQ and the BD-rate is also computed against "Base". For each Test 1-5, the results in columns (a) and (b) were obtained by using VAEs which were trained as in Section 2.2. The results in columns (c) were obtained by using TCQ and the training details from Section 3.2. ( ).: BD-rate is computed using (a) as reference.

The experiment shows a clear relationship between the training point and the possible gains achievable by TCQ without adapting the training stage. In Tests 1-2 (a), which are models trained for the highest bitrates and scalar quantization, TCQ can still achieve significant performance improvements of up to 5.85% in low bitrate; see Test 2 (b).

Next, we examine the performance of the networks which were optimized as described above with respect to Trellis coded quantization. In Test 3 (c), which is the model optimized for the central operation point, TCQ can achieve performance improvements of 4.40% and 7.69% for high and low bitrate respectively. Hence, this single network's compression efficiency significantly exceeds the variable-rate base VAE in combination with TCQ. In general, the TCQ-optimized VAEs in Tests 1-5 (c) consistently achieve higher or similar bitrate savings than their counterparts (b) which were optimized for scalar quantization.

Especially for low bitrates, implementing TCQ after the optimization has shown to be ineffective in contrast to our proposed training method.

In the following tests we tried to determine the best combination of networks and TCQ usage. The results are shown at the bottom of Table 2. The best performance was achieved by using each of the networks from Test 1 to 5 for the corresponding rate point. The last row compares the best scalar run with the best TCQ runs which demonstrates the benefit of the training modification. Using the results in (a) as anchor, the bitrate savings of TCQ rise from about 1.8% in (b) to 2.4% in (c) in lower bitrate, but remains similar around 2.2% in higher bitrate.

Accordingly, embodiments of the invention can achieve coding gains can by applying trellis-coded quantization to the features of a variational auto-encoder. In case of a variable-rate VAE originally optimized for scalar quantization, the gains are primarily present in the lower bi-trate range, where 4.83% BD-rate improvement is achieved. When a single network is optimized with respect to TCQ, the savings in the lower bitrate range increase to about 7.69%. When separate VAEs are trained for each target bitrate, using TCQ instead of the scalar quantizer is shown to be beneficial, as well. By using the presented training method, the coding gain obtained from TCQ increases from about 1.8% to 2.4% in lower bit rate.

Implementation Alternatives

In the following, implementation alternatives of any of the embodiments described above are described.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a data bitstream product, e.g. a video bitstream product, including the data stream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J. Ballé, V. Laparra, and E. P. Simoncelli, "End-to-end optimized image compression," in *International Conference on Learning Representations* (*ICLR*), Toulon, France, April 2017.

[2] D. Marpe, H. Schwarz, and T. Wiegand, "Context-based adaptive binary arithmetic coding in the h.264/avc video compression standard," *IEEE Transactions on Circuits and Systems for Video Technology*, vol. 13, no. 7, pp. 620-636, 2003.

[3] V. K. Goyal, "Theoretical foundations of transform coding," *IEEE Signal Processing Magazine*, vol. 18, no. 5, pp. 9-21, 2001.

[4] W. Han G. J. Sullivan, J.-R. Ohm and T. Wiegand, "Overview of the high efficiency video coding (HEVC) standard," *IEEE Transactions on Circuits and Systems for Video Technology*, vol. 22, no. 12, pp. 1649-1668, 2012.

[5] "High Efficiency Video Coding," *ITU-T Rec. H.*265 *and ISO/IEC* 23008-10, 2013.

[6] G. K. Wallace, "The jpeg still picture compression standard," *IEEE Transactions on Consumer Electronics*, vol. 38, no. 1, pp. xviii-xxxiv, 1992.

[7] David Taubman and Michael Marcellin, *JPEG*2000 *Image Compression Fundamentals, Standards and Practice*, Springer Publishing Company, Incorporated, 2013.

[8] Michael SchÃ¤fer, Sophie Pientka, Jonathan Pfaff, Heiko Schwarz, Detlev Marpe, and Thomas Wiegand, "Rate-distortion-optimization for deep image compression," in 2021 *IEEE International Conference on Image Processing* (*ICIP*), 2021, pp. 3737-3741.

[9] Michael SchÃ¤fer, Sophie Pientka, Jonathan Pfaff, Heiko Schwarz, Detlev Marpe, and Thomas Wiegand, "Rate-distortion optimized encoding for deep image compression," *IEEE Open Journal of Circuits and Systems*, vol. 2, pp. 633-647, 2021.

[10] George Toderici, Sean M. O'Malley, Sung Jin Hwang, Damien Vincent, David Minnen, Shumeet Baluja, Michele Covell, and Rahul Sukthankar, "Variable rate image compression with recurrent neural networks," in 4*th International Conference on Learning Representations, ICLR* 2016, San Juan, Puerto Rico, May 2-4, 2016, *Conference Track Proceedings*, Yoshua Bengio and Yann LeCun, Eds., 2016.

[11] F. Yang, L. Herranz, J. v. d. Weijer, J. A. I. Guitián, A. M. López, and M. G. Mozerov, "Variable Rate Deep Image Compression With Modulated Autoencoder," *IEEE Signal Processing Letters, vol.* 27, pp. 331-335, 2020.

[12] Johannes Balle, David Minnen, Saurabh Singh, Sung Jin Hwang, and Nick Johnston, "Variational image compression with a scale hyperprior," in *International Conference on Learning Representations,* 2018.

[13] Johannes Ballé, Philip Chou, David Minnen, Saurabh Singh, Nick Johnston, Eirikur Agustsson, Sung Hwang, and George Toderici, "Nonlinear Transform Coding," *IEEE Journal of Selected Topics in Signal Processing*, vol. PP, pp. 1-1, 10 2020.

[14] T. D. Lookabaugh and R. M. Gray, "High-resolution quantization theory and the vector quantizer advantage," *IEEE Transactions on Information Theory*, vol. 35, no. 5, pp. 1020-1033, 1989.

[15] Diederik P. Kingma and Jimmy Ba, "Adam: A Method for Stochastic Optimization," in 3*rd International Conference on Learning Representations, ICLR* 2015, San Diego, CA, USA, May 7-9, 2015, *Conference Track Proceedings*, Yoshua Bengio and Yann LeCun, Eds., 2015.

[16] Binglin Li, Mohammad Akbari, Jie Liang, and Yang Wang, "Deep learning-based image compression with trellis coded quantization," in 2020 *Data Compression Conference* (*DCC*), 2020, pp. 13-22.

[17] Michael W. Marcellin, Margaret A. Lepley, Ali Bilgin, Thomas J. Flohr, Troy T. Chinen, and James H. Kasner, "An overview of quantization in jpeg 2000," *Signal Processing: Image Communication*, vol. 17, no. 1, pp. 73-84, January 2002.

[18] M. W. Marcellin and T. R. Fischer, "Trellis coded quantization of memoryless and gauss-markov sources," *IEEE Transactions on Communications*, vol. 38, no. 1, pp. 82-93, 1990.

[19] F. Mentzer, E. Agustsson, M. Tschannen, R. Timofte, and L. V. Gool, "Conditional probability models for deep image compression," in 2018 *IEEE/CVF Conference on Computer Vision and Pattern Recognition,* 2018, pp. 4394-4402.

[20] David Minnen, Johannes Balle, and George D Toderici, "Joint Autoregressive and Hierarchical Priors for Learned Image Compression," in *Advances in Neural Information Processing Systems*, S. Bengio, H. Wallach, H. Larochelle, K. Grauman, N. Cesa-Bianchi, and R. Garnett, Eds. 2018, vol. 31, pp. 10771-10780, Curran Associates, Inc.

[21] David Minnen and Saurabh Singh, "Channel-wise autoregressive entropy models for learned image compression," in 2020 *IEEE International Conference on Image Processing* (*ICIP*), 2020, pp. 3339-3343.

[22] Heiko Schwarz, Tung Nguyen, Detlev Marpe, and Thomas Wiegand, "Hybrid video coding with trellis-coded quantization," in 2019 *Data Compression Conference* (*DCC*), 2019, pp. 182-191.

[23] H. Schwarz, T. Nguyen, D. Marpe, T. Wiegand, M. Karczewicz, M. Coban, and J. Dong, "Improved Quantization and Transform Coefficient Coding for the Emerging Versatile Video Coding (VVC) Standard," in 2019 *IEEE International Conference on Image Processing* (*ICIP*), 2019, pp. 1183-1187.

[24] Heiko Schwarz, Muhammed Coban, Marta Karczewicz, Tzu-Der Chuang, Frank Bossen, Alexander Alshin, Jani Lainema, Christian R. Helmrich, and Thomas Wiegand, "Quantization and entropy coding in the versatile video coding (vvc) standard," *IEEE Transactions on Circuits and Systems for Video Technology*, vol. 31, no. 10, pp. 3891-3906, 2021.

[25] G. D. Forney, "The viterbi algorithm," *Proceedings of the IEEE*, vol. 61, no. 3, pp. 268-278, 1973.

[26] "Versatile Video Coding," *ITU-T Rec. H.266 and ISO/IEC* 23090-3, 2020.

[27] B. Bross, Y.-K. Wang, Y. Ye, S. Liu, J. Chen, G. J. Sullivan, and J.-R. Ohm, "Overview of the versatile video coding (vvc) standard and its applications," *IEEE Transactions on Circuits and Systems for Video Technology*, vol. 31, no. 10, pp. 3736-3764, 2021.

[28] J. Deng, W. Dong, R. Socher, L.-J. Li, K. Li, and L. Fei-Fei, "ImageNet A Large-Scale Hierarchical Image Database," in CVPR09, 2009.

[29] "Kodak image dataset," last checked on 2021 Jan. 20, available at http://r0k.us/graphics/kodak/.

[30] G. Bjontegaard, "Calculation of average PSNR differences be-tween RD-Curves," Proceedings of the ITU-T Video Coding Experts Group (VCEG) Thirteenth Meeting, January 2001.

The invention claimed is:

1. Apparatus for decoding a picture from a data stream, configured for sequentially reconstructing a set of features, wherein the apparatus is configured for reconstructing a feature of the set of features by deriving a quantization index from the data stream using arithmetic decoding, mapping the quantization index to a reconstruction value in dependence on a quantization state, and assigning the reconstruction value to the feature, updating the quantization state in dependence on the quantization index and the quantization state, and using a machine learning predictor for deriving the picture based on the set of features, wherein the apparatus is configured for deriving probabilities for the arithmetic decoding of the quantization index in dependence on the quantization state.

2. Apparatus according to claim 1, configured for sequentially reconstructing the features of the set of features according to a coding order, and/or wherein each of the features of the set of features is associated with a respective position of one of one or more arrays, and wherein the apparatus is configured for sequentially reconstructing the one or more arrays according to a coding order among the arrays, and/or sequentially reconstructing the features of the one or more arrays according to respective raster scan orders defined within the one or more arrays.

3. Apparatus according to claim 1, wherein each of the features of the set of features is associated with a respective position of one of one or more arrays, and wherein the apparatus is configured for using respective initial quantization states as the quantization states for the reconstruction of respective first features of the one or more arrays.

4. Apparatus according to claim 3, wherein the initial quantization states are predetermined, or wherein the apparatus is configured for deriving the initial quantization states from the data stream.

5. Apparatus according to claim 1, configured for deriving the quantization state for the reconstruction of a first feature of the set of features from the data stream, or using a predetermined state as the quantization state for the reconstruction of a first feature of the set of features.

6. Apparatus according to claim 1, wherein the updating of the quantization state depends on a parity of the quantization index.

7. Apparatus according to claim 1, wherein the apparatus is configured for deriving the probabilities for the arithmetic decoding of the quantization index based on a probability model, wherein the apparatus is configured for deriving a parametrization of the probability model.

8. Apparatus according to claim 7, configured for deriving the parametrization of the probability model from the data stream.

9. Apparatus according to claim 7, configured for decoding a set of hyper parameters from the data stream, and using a machine learning predictor for deriving the parametrization of the probability model based on the hyper parameters.

10. Apparatus according to claim 7, wherein the parametrization of the probability model is predefined.

11. Apparatus according to claim 8, configured for deriving the parametrization of the probability model in dependence on one or more previously reconstructed features and/or one or more previously decoded quantization indices.

12. Apparatus according to claim 8, wherein the apparatus is configured for deriving a respective parametrization of the probability model for each of the features of the set of features, or wherein each of the features of the set of features is associated with a respective position of one of one or more arrays, and wherein the apparatus is configured for deriving a respective parametrization of the probability model for each of the arrays.

13. Apparatus according to claim 7, configured for deriving the probabilities for the arithmetic decoding of the quantization index by evaluating the probability model within respective boundaries for a set of quantization index values, wherein the apparatus is configured for deriving the boundaries in dependence on the quantization state and the parametrization of the probability model.

14. Apparatus according to claim 13, wherein the boundaries are the midpoints between reconstruction values associated with two neighboring quantization index values, or wherein the boundaries are shifted with respect to the midpoints between reconstruction values associated with two neighboring quantization index values in dependence on the respective quantization index value and/or in dependence on the quantization state.

15. Apparatus according to claim 1, wherein the arithmetic decoding is a binary arithmetic decoding, and wherein the apparatus is configured for deriving the probabilities for the binary arithmetic decoding of the quantization index based on probabilities for a set of quantization index values, and deriving the probabilities for the set of quantization index values based on a probability model.

16. Apparatus according to claim 1, wherein the arithmetic decoding is a binary arithmetic decoding, and wherein the apparatus is configured for deriving the probabilities for the binary arithmetic decoding of a binary representation of the quantization index in dependence on one or more of an index of a currently decoded bin of the binary representation, a set of hyper parameters decoded from the data stream, one or more previously reconstructed features and/or one or more previously decoded quantization indices.

17. Apparatus according to claim 1, configured for deriving the probabilities for the binary arithmetic decoding of a bin of a binary representation of the quantization index by selecting a machine learning predictor out of a set of machine learning predictors based on the quantization state and/or an index of the bin, using the selected further machine learning predictor for deriving the probabilities based on a set of hyper parameters and/or one or more previously reconstructed features and/or one or more previously decoded quantization indices.

18. Apparatus according to claim 7, wherein the probability model is a Gaussian distribution, and wherein the parametrization comprises a first parameter indicating the mean and a second parameter indicating the variance of the Gaussian distribution.

19. Apparatus according to claim 7, wherein the mapping of the quantization index to the reconstruction values depends on the quantization state and the parametrization of the probability model.

20. Apparatus for encoding a picture into a data stream, configured for using a machine learning predictor for deriving a set of features based on the picture, and sequentially encoding the set of features, wherein the apparatus is configured for encoding a feature of the set of features by deriving a quantization index for the feature in dependence on a quantization state, updating the quantization state in dependence on the quantization index and the quantization state, and encoding the quantization index into the data stream using arithmetic coding, wherein the apparatus is configured for deriving probabilities for the arithmetic coding of the quantization index in dependence on the quantization state.

21. Method for decoding a picture from a data stream, comprising sequentially reconstructing a set of features, wherein the method comprises reconstructing a feature of the set of features by deriving a quantization index from the data stream using arithmetic decoding, mapping the quantization index to a reconstruction value in dependence on a quantization state, and assigning the reconstruction value to the feature, updating the quantization state in dependence on the quantization index and the quantization state, and using a machine learning predictor for deriving the picture based on the set of features, wherein the method comprises deriving probabilities for the arithmetic decoding of the quantization index in dependence on the quantization state.

* * * * *